US012804306B2

(12) United States Patent
Zhang et al.

(10) Patent No.: US 12,804,306 B2
(45) Date of Patent: Nov. 17, 2026

(54) LOUDSPEAKER APPARATUS

(71) Applicant: SHENZHEN SHOKZ CO., LTD., Shenzhen (CN)

(72) Inventors: Lei Zhang, Shenzhen (CN); Yongjian Li, Shenzhen (CN); Wenbing Zhou, Shenzhen (CN); Jinbo Zheng, Shenzhen (CN); Zhuyang Jiang, Shenzhen (CN)

(73) Assignee: SHENZHEN SHOKZ CO., LTD., Shenzhen (CN)

(*) Notice: Subject to any disclaimer, the term of this patent is extended or adjusted under 35 U.S.C. 154(b) by 227 days.

(21) Appl. No.: 18/635,058

(22) Filed: Apr. 15, 2024

(65) Prior Publication Data

US 2024/0259728 A1 Aug. 1, 2024

Related U.S. Application Data

(63) Continuation of application No. 18/491,786, filed on Oct. 22, 2023, now Pat. No. 12,490,014, which is a (Continued)

(30) Foreign Application Priority Data

Jan. 5, 2019 (CN) ........................ 201910009909.6

(51) Int. Cl.
*H04R 1/10* (2026.01)
*H04R 1/06* (2006.01)

(Continued)

(52) U.S. Cl.
CPC ............ *H04R 1/1075* (2013.01); *H04R 1/06* (2013.01); *H04R 1/1016* (2013.01); *H04R 1/105* (2013.01);

(Continued)

(58) Field of Classification Search
CPC ...... H04R 1/1075; H04R 1/06; H04R 1/1016; H04R 1/105; H04R 1/1066; H04R 1/1091;

(Continued)

(56) References Cited

U.S. PATENT DOCUMENTS 6,456,720 B1 9/2002 Brimhall et al.
7,798,831 B2 * 9/2010 Sanford ................ H01R 43/24 439/38

(Continued)

FOREIGN PATENT DOCUMENTS

CN 204014011 U 12/2014
CN 204272346 U 4/2015

(Continued)

OTHER PUBLICATIONS

International Search Report in PCT/CN2019/102383 mailed on Nov. 29, 2019, 8 pages.

(Continued)

*Primary Examiner* — Angelica M McKinney
(74) *Attorney, Agent, or Firm* — METIS IP LLC

(57) ABSTRACT

The present disclosure discloses a loudspeaker apparatus. The loudspeaker apparatus may include a support connection member configured to contact with a user's head. The loudspeaker apparatus may include at least one loudspeaker assembly. The loudspeaker assembly may include an earphone core and a core housing configured to accommodate the earphone core. The core housing may be fixedly connected to the support connection member. At least one button module may be arranged on the core housing. The interior of the core housing may further include at least two microphones, and the at least two microphones may be arranged at a position different from a user's mouth. The loudspeaker apparatus may further include a control circuit (Continued)

or a battery accommodated in the support connection member. The control circuit or the battery may drive the earphone core to vibrate to generate sound.

20 Claims, 23 Drawing Sheets

Related U.S. Application Data continuation of application No. 17/305,244, filed on Jul. 1, 2021, now Pat. No. 11,800,275, which is a continuation of application No. PCT/CN2019/102383, filed on Aug. 24, 2019.

(51) Int. Cl.
*H04R 5/033* (2006.01)
*H04R 9/02* (2006.01)
*H04R 9/06* (2006.01)

(52) U.S. Cl.
CPC ......... *H04R 1/1066* (2013.01); *H04R 1/1091* (2013.01); *H04R 5/0335* (2013.01); *H04R 9/02* (2013.01); *H04R 9/06* (2013.01); *H04R 1/1041* (2013.01); *H04R 2201/109* (2013.01); *H04R 2420/07* (2013.01); *H04R 2460/13* (2013.01)

(58) Field of Classification Search
CPC .......... H04R 5/0335; H04R 9/02; H04R 9/06; H04R 1/1041; H04R 2201/109; H04R 2420/07; H04R 2460/13; H04R 1/1008; H04R 5/033; H05K 1/189; G10K 11/17857; H01R 43/24
See application file for complete search history.

(56) References Cited

U.S. PATENT DOCUMENTS 9,674,597 B1 * 6/2017 O'Connell ............. H04R 5/033
11,509,994 B2 * 11/2022 Zhang .............. G10K 11/17857
11,592,690 B2 * 2/2023 Wang ..................... H05K 1/189
11,678,102 B2 6/2023 Li et al.
11,800,275 B2 10/2023 Zhang et al.
12,185,054 B2 * 12/2024 Zhang .................. H04R 1/1066
12,389,170 B2 8/2025 Qi et al.
12,490,014 B2 * 12/2025 Zhang .................. H04R 1/1066
2009/0185699 A1 7/2009 Kim
2016/0050474 A1 2/2016 Rye et al.
2017/0118567 A1 4/2017 Larssen et al.
2017/0180841 A1 6/2017 Koido et al.
2021/0168482 A1 6/2021 Wang et al.
2022/0303665 A1 9/2022 Zhang et al.
2025/0126398 A1 4/2025 Zhang et al.

FOREIGN PATENT DOCUMENTS

CN 204465795 U 7/2015
CN 105025418 A 11/2015
CN 204906692 U 12/2015
CN 205039969 U 2/2016
CN 205336486 U 6/2016
CN 205726269 U 11/2016
CN 205864669 U 1/2017
CN 205946101 U 2/2017
CN 106604174 A 4/2017
CN 106792312 A 5/2017
CN 107454492 A 12/2017
CN 107493532 A 12/2017
CN 207070263 U 3/2018
CN 108391213 A 8/2018
CN 108429975 A 8/2018
CN 208079380 U 11/2018
CN 209358727 U 9/2019
CN 209358771 U 9/2019
CN 107454492 B 4/2024
JP 2004229147 A 8/2004
KR 101782435 B1 9/2017
WO 2012002605 A1 1/2012
WO 2016206029 A1 12/2016
WO 2017039039 A1 3/2017

OTHER PUBLICATIONS

Written Opinion in PCT/CN2019/102383 mailed on Nov. 29, 2019, 12 pages.
Examination Decision on Request for Invalidation in Chinese Application No. 201920025023.6 mailed on Oct. 19, 2023, 30 pages.
Examination Decision on Request for Invalidation in Chinese Application No. 201920031804.6 mailed on Jan. 7, 2025, 42 pages.

* cited by examiner

LOUDSPEAKER APPARATUS

CROSS REFERENCE TO RELATED APPLICATIONS

This application is a continuation of U.S. patent application Ser. No. 18/491,786, filed on Oct. 22, 2023, which is a Continuation of U.S. patent application Ser. No. 17/305,244, filed on Jul. 1, 2021, now U.S. Pat. No. 11,800,275, which is a Continuation of International Application No. PCT/CN2019/102383, filed on Aug. 24, 2019, which claims priority of Chinese Patent Application No. 201910009909.6, filed on Jan. 5, 2019, the entire contents of which are incorporated by reference.

TECHNICAL FIELD

The present disclosure relates to a loudspeaker apparatus, and in particular, to a button module of a loudspeaker apparatus.

BACKGROUND

At present, the loudspeaker assembly of a loudspeaker apparatus on the market is equipped with a button module and an auxiliary button module for the convenience of a user to perform corresponding functions. Users can implement the corresponding functions through the button module and the auxiliary button module, such as pausing or playing music, and answering calls. However, impacts on the operating state of the loudspeaker assembly, for example, the button module may reduce the volume generated by the loudspeaker assembly to a certain extent, are not considered when the button module and the auxiliary button module are set.

SUMMARY

The embodiments of the present disclosure provide a loudspeaker apparatus. The loudspeaker apparatus may include a support connection member configured to contact with a user's head; at least one loudspeaker assembly, wherein the loudspeaker assembly may include an earphone core and a core housing configured to accommodate the earphone cord, the core housing may be fixedly connected to the support connection member, at least one button module may be arranged on the core housing, the interior of the core housing may further include at least two microphones, and the at least two microphones may be arranged at a position different from a user's mouth; and a control circuit or a battery accommodated in the support connection member, wherein the control circuit or the battery may drive the earphone core to vibrate to generate sound.

In some embodiments, a contact position between the support connection member and a human head may include at least one contact point, and a distance between a center of the button module and one of the at least one contact point may not be greater than a distance between a center of the core housing and one of the at least one contact point.

In some embodiments, the center may be a barycenter or a centroid.

In some embodiments, the core housing may include an outer sidewall away from the human head and a peripheric sidewall connecting with and surrounding the outer sidewall.

In some embodiments, the peripheric sidewall may include a first peripheric sidewall arranged along a length direction of the outer sidewall and a second peripheric sidewall arranged along a width direction of the outer sidewall, and the outer sidewall and the peripheric sidewall may be connected together to form a cavity with an opening at one end for accommodating the earphone core.

In some embodiments, the button module may be arranged at a central position of the outer sidewall, or the button module may be arranged between the central position and a top position of the outer sidewall.

In some embodiments, the button module may include a button and an elastic bearing pedestal configured to support the button, and the outer sidewall may be configured with a button hole configured to cooperate with the button.

In some embodiments, a connection part of the support connection member and the core housing may have a central axis. An extension line of the central axis may have a projection on a plane that the outer sidewall of the button module is arranged, and an angle between the projection and a major-axis direction of the button module may be less than 10°.

In some embodiments, the major-axis direction and a minor-axis direction of the outer sidewall of the button module may have an intersection point. A distance between the projection and the intersection point may be a shortest distance, and the shortest distance may be less than a size of the outer sidewall of the button module in the minor-axis direction.

In some embodiments, a distance between the center of the button module and the at least one contact point of the loudspeaker assembly may be a first distance. A distance between the center of the core housing and the at least one contact point of the loudspeaker assembly may be a second distance, and a ratio of the first distance to the second distance may not be greater than 0.95.

In some embodiments, a ratio of the mass of the button module to the mass of the loudspeaker assembly may not be greater than 0.3.

In some embodiments, an auxiliary function module may be configured to receive an auxiliary signal, and perform an auxiliary function. The auxiliary function module may include the at least two microphones, and a first flexible circuit board may be configured to electrically connect an audio signal wire and an auxiliary signal wire of an external control circuit. The audio signal wire and the auxiliary signal wire may be electrically connected to the earphone core and the auxiliary function module through the first flexible circuit board, respectively.

In some embodiments, the first flexible circuit board may include at least a main circuit board and a first branch circuit board. The first branch circuit board may be connected to the main circuit board and extend away from the main body circuit board along one end of the main circuit board, and the auxiliary function module may include at least a first auxiliary function module and a second auxiliary function module. The first auxiliary function module may be arranged on the main circuit board, and the second auxiliary function module may be arranged on the first branch circuit board.

In some embodiments, the first flexible circuit board may further include a second branch circuit board, wherein the second branch circuit board may be connected to the main circuit board, extend away from the main circuit board along the other end of the main circuit board, and be spaced apart from the first branch circuit board. The auxiliary function module may further include a third auxiliary function module arranged on the second branch circuit board.

In some embodiments, the core housing may further include a bottom wall corresponding to the outer sidewall and connected to the end surface of the peripheric sidewall. The first branch circuit board may be arranged facing the bottom wall, and the second branch circuit board may be arranged facing the peripheric sidewall. The second auxiliary function module may include a first microphone element. The third auxiliary function module may include a second microphone element. The first microphone element may be arranged on one side of the first branch circuit board facing the bottom wall, and the second microphone element may be arranged on one side of the second branch circuit board facing the peripheric sidewall.

In some embodiments, a first sound-inlet hole may be arranged on the core housing, and the loudspeaker assembly may further include an annular retaining wall integrally formed on an inner surface of the core housing, arranged on the periphery of the first sound-inlet hole, and defining an accommodating space communicating with the first sound-inlet hole; a waterproof membrane assembly arranged in the accommodating space and covering the first sound-inlet hole; and a rigid support board arranged in the accommodating space, wherein the waterproof membrane assembly may be pressed against the inner surface of the core housing, and a second sound-inlet hole may be arranged on the rigid support board.

In some embodiments, the waterproof membrane assembly may include a waterproof membrane body and a first annular rubber pad arranged on one side of the waterproof membrane body facing the rigid support board. The first annular rubber pad may be arranged on the periphery of the first input-sound hole and the second input-sound hole, and the rigid support board may be pressed against the first annular rubber pad.

In some embodiments, the first annular rubber pad may be arranged between the waterproof membrane body and the rigid support board to form a sealed cavity connected to the microphone through the second sound-inlet hole.

In some embodiments, the waterproof membrane assembly may further include a second annular rubber pad arranged on one side of the waterproof membrane body facing the inner surface of the core housing. The second annular rubber pad and the first annular rubber pad overlapping.

In some embodiments, a first depression area may be arranged on an inner surface of the core housing, and the core housing may be configured with a button hole arranged in the first depression area and configured to connect the inner surface and an outer surface of the core housing.

In some embodiments, the loudspeaker apparatus may further include an elastic bearing pedestal including an integrally formed bearing pedestal body and a support column, wherein the bearing pedestal body may be arranged in the first depression area and fixed to the bottom of the first depression area. The support column may be arranged on one side of the bearing pedestal body facing the outside of the core housing and exposed out of the button hole; and a button arranged on the exposed part of the support column.

In some embodiments, the bearing pedestal body may include an annular fixed part arranged around the button hole and attached and fixed to the bottom of the first depression area, and an elastic support part connected to an inner ring surface of the annular fixed part and bulging in a dome shape facing the outside of the core housing, wherein the support column may be arranged at the top of the elastic support part.

In some embodiments, a second depression area may be arranged on the outer surface of the core housing, wherein the button hole may be further arranged in the second depression area, the button may be at least partially sunk in the second depression area.

In some embodiments, the button may include a button body, a first annular flange and a second annular flange arranged on one side of the button body. The first annular flange may be arranged in a middle area of the button body. The second annular flange may be arranged on an outer edge of the button body. The support column may be inserted inside the first annular flange. An end surface of the second annular flange away from the button body may be sunk in the second depression area, and be spaced apart from the bottom of the second depression area by a certain distance when the elastic bearing pedestal is in a natural state.

In some embodiments, the elastic bearing pedestal may further include a contact head arranged on an inner side of the bearing pedestal body adjacent to the core housing and configured to contact the button.

In some embodiments, the core housing may include a main housing and a baffle assembly. The baffle assembly may be arranged inside the main housing and connected to the main housing, thereby separating an inner space of the main housing into a first accommodating space and a second accommodating space, and the core housing may also be arranged with a plug hole communicating with the outer end surface of the core housing.

In some embodiments, the second accommodating space may be adjacent to the plug hole.

In some embodiments, the main housing may comprise a peripheric sidewall and a bottom wall connected to one end surface of the peripheric sidewall.

In some embodiments, the baffle assembly may include a side baffle connected to the peripheric sidewall at two ends, and a bottom baffle spaced apart from the bottom wall and connected to the peripheric sidewall and the side baffle, respectively, and the bottom baffle may be configured with a wiring hole.

BRIEF DESCRIPTION OF THE DRAWINGS

The present disclosure is further illustrated in terms of exemplary embodiments. These exemplary embodiments are described in detail with reference to the drawings. These embodiments are non-limiting exemplary embodiments, in which the same reference numbers represent the same structures, and wherein.

DETAILED DESCRIPTION

Figure 1:
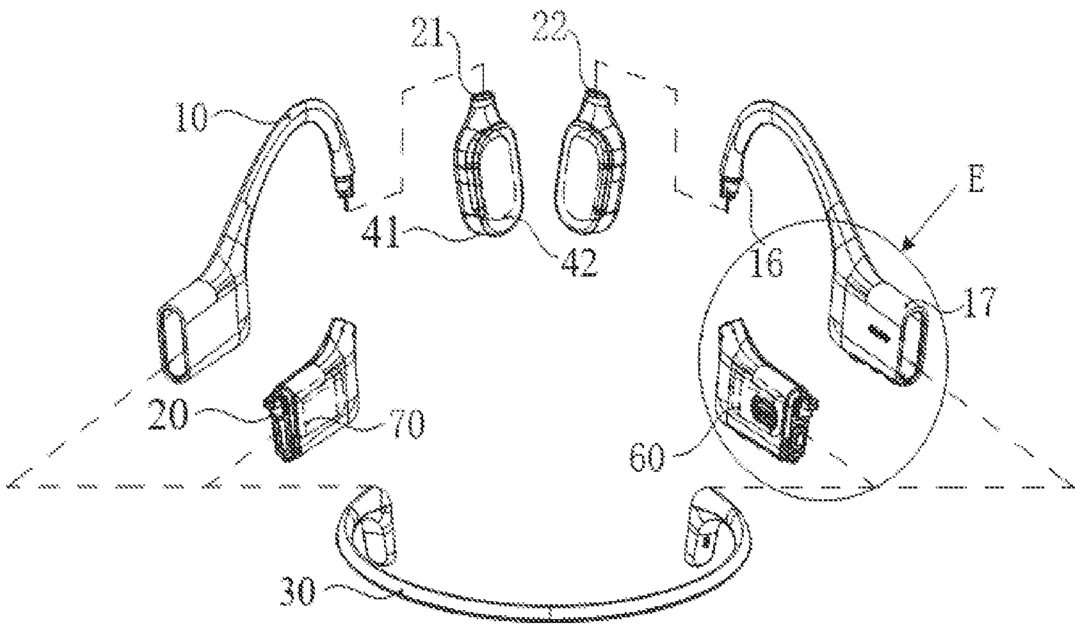
FIG. 1 is an exploded structural diagram of a loudspeaker apparatus according to some embodiments of the present disclosure.

In order to illustrate the technical solutions related to the embodiments of the present disclosure, brief introduction of the drawings referred to in the description of the embodiments is provided below. Obviously, drawings described below are only some examples or embodiments of the present disclosure. Those having ordinary skills in the art, without further creative efforts, may apply the present disclosure to other similar scenarios according to these drawings. It should be understood that the exemplary embodiments are provided merely for better comprehension and application of the present disclosure by those skilled in the art, and not intended to limit the scope of the present disclosure. Unless obviously obtained from the context or the context illustrates otherwise, the same numeral in the drawings refers to the same structure or operation.

As used in the disclosure and the appended claims, the singular forms “a,” “an,” and “the” include plural referents unless the content clearly dictates otherwise. In general, the terms “comprise,” “comprises,” and/or “comprising,” “include,” “includes,” and/or “including,” merely prompt to include steps and elements that have been clearly identified, and these steps and elements do not constitute an exclusive listing. The methods or devices may also include other steps or elements. The term “based on” is “based at least in part on.” The term “one embodiment” means “at least one embodiment”. The term “another example” means “at least one other embodiment”. Related definitions of other terms will be given in the description below. In the following, without loss of generality, the “loudspeaker apparatus” or “loudspeaker” may be used when describing a related technology of sound conduction in the present disclosure. This description is only a form of sound conduction application, for those skilled in the art, “loudspeaker apparatus” or “loudspeaker” may also be replaced with other similar words, such as “sounding devices”, “hearing aid”, “speaker device” or ”, etc. In fact, the various implementations in the present disclosure may be easily applied to other non-speaker-type hearing devices. For example, for those skilled in the art, after understanding the basic principle of the loudspeaker apparatus, it may be possible to make various modifications and changes in the form and details of the specific methods and operations of implementing the loudspeaker apparatus without departing from the principles. In particular, an environmental sound collection and processing function may be added to the loudspeaker apparatus to implement the function of a hearing aid. For example, a microphone may pick up sound of surrounding environment of a user/wearer, process the sound using a certain algorithm and transmit the processed sound (or generated electrical signal) to a loudspeaker. That is, the loudspeaker apparatus may be modified to include the function of collecting the environmental sound, and after a certain signal processing, the sound may be transmitted to the user/wearer via the loudspeaker component, thereby simultaneously implementing the function of a hearing aid and a conventional loudspeaker apparatus. As an example, the algorithm mentioned herein may include noise cancellation, automatic gain control, acoustic feedback suppression, wide dynamic range compression, active environmental recognition, active noise reduction, directional processing, tinnitus processing, multi-channel wide dynamic range compression, active howling suppression, volume control, or the like, or any combination thereof.

FIG. 1 is an exploded structural diagram of a loudspeaker apparatus according to some embodiments of the present disclosure. As shown in FIG. 1, the loudspeaker apparatus may include ear hooks 10, circuit housings 20, core housings 41, a rear hook 30, earphone cores 42, a control circuit 60, and a battery 70. A core housing 41 and a circuit housing 20 may be arranged at two ends of a corresponding ear hook 10, respectively. The rear hook 30 may be arranged at ends of the circuit housings 20 away from the ear hooks 10. The count of core housings 41 may be two, which are configured to accommodate the earphone cores 42, respectively. The count of circuit housings 20 may also be two, which are configured to accommodate the control circuit 60 and the battery 70, respectively, the two ends of the rear hook 30 may be connected to the corresponding circuit housings 20, respectively. The core housings 41 may include an outer sidewall away from the human head and a peripheric sidewall connecting with and surrounding the outer sidewall. An ear hook 10 may include an elastic metallic wire 11, a wire 12, a fixed sleeve 13, a plug-in end 14 and a plug-in end 15 arranged at two ends of the elastic metallic wire 11. The ear hooks 10 may further include a protective sleeve 16 and a housing sheath 17 integrally formed with the protective sleeve 16.

Figure 2:
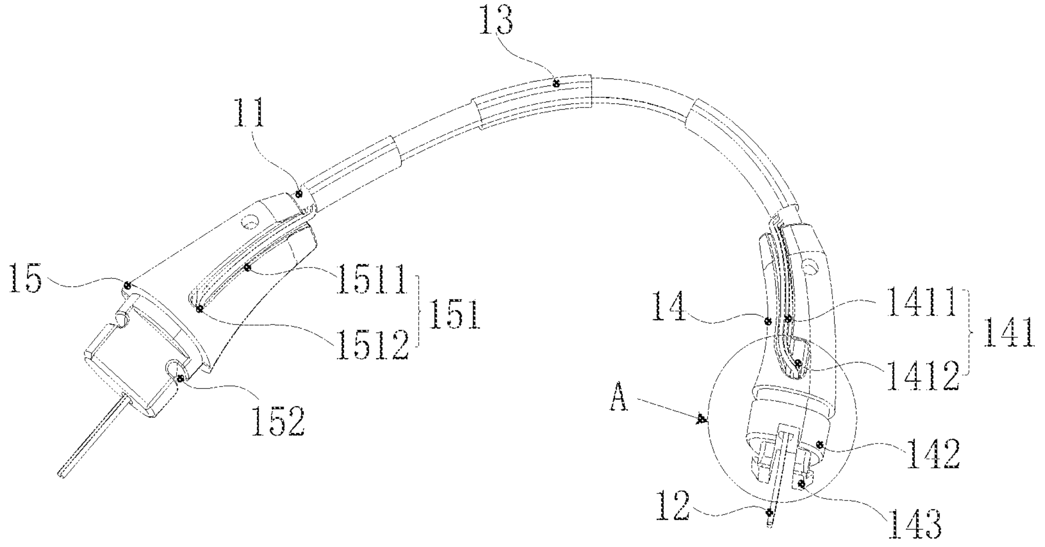
FIG. 2 is a partial structural diagram of an ear hook of a loudspeaker apparatus according to some embodiments of the present disclosure.
Figure 3:
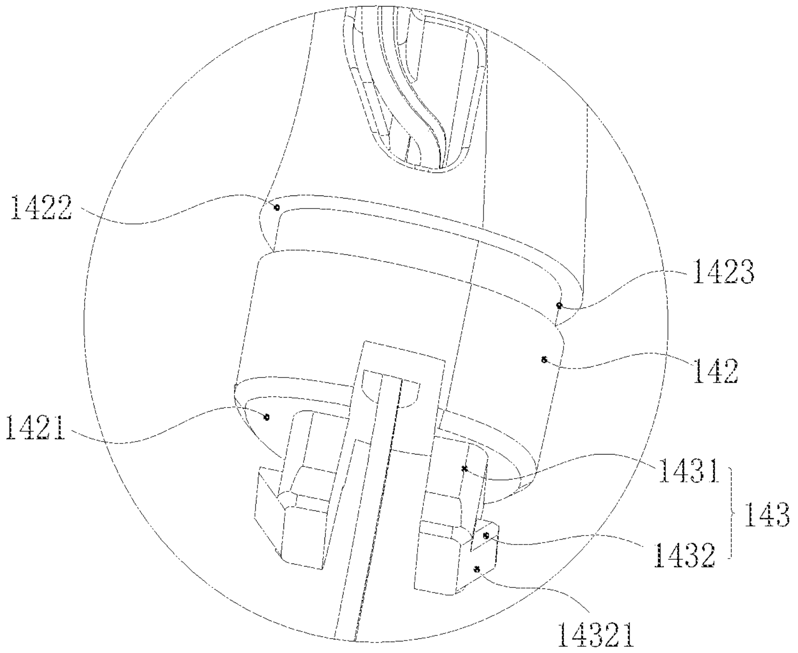
FIG. 3 is a partial enlarged view of part A in FIG. 2.
Figure 4:
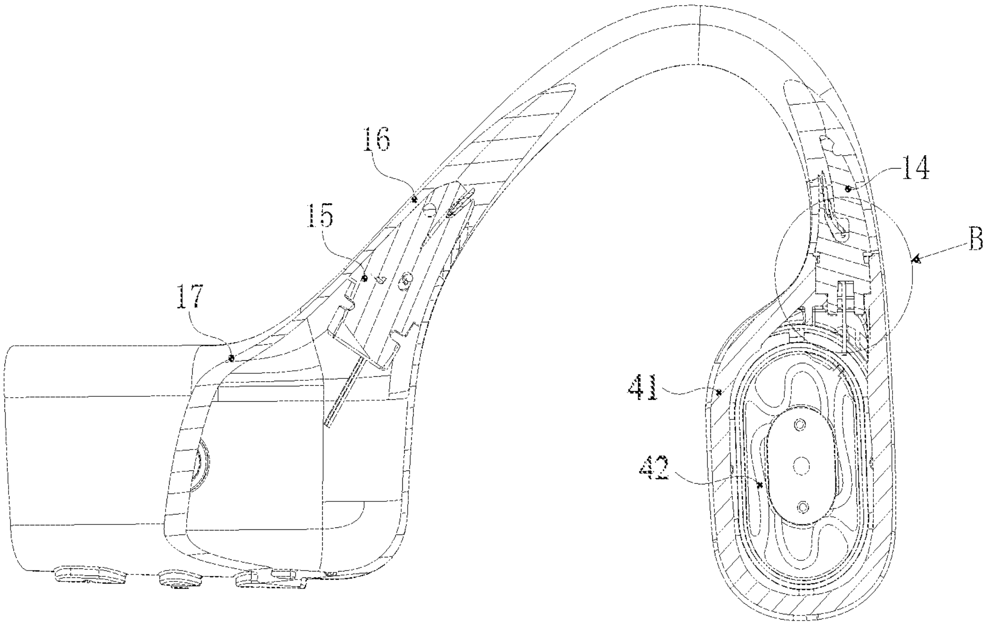
FIG. 4 is a partial sectional view of a loudspeaker apparatus according to some embodiments of the present disclosure.
Figure 5:
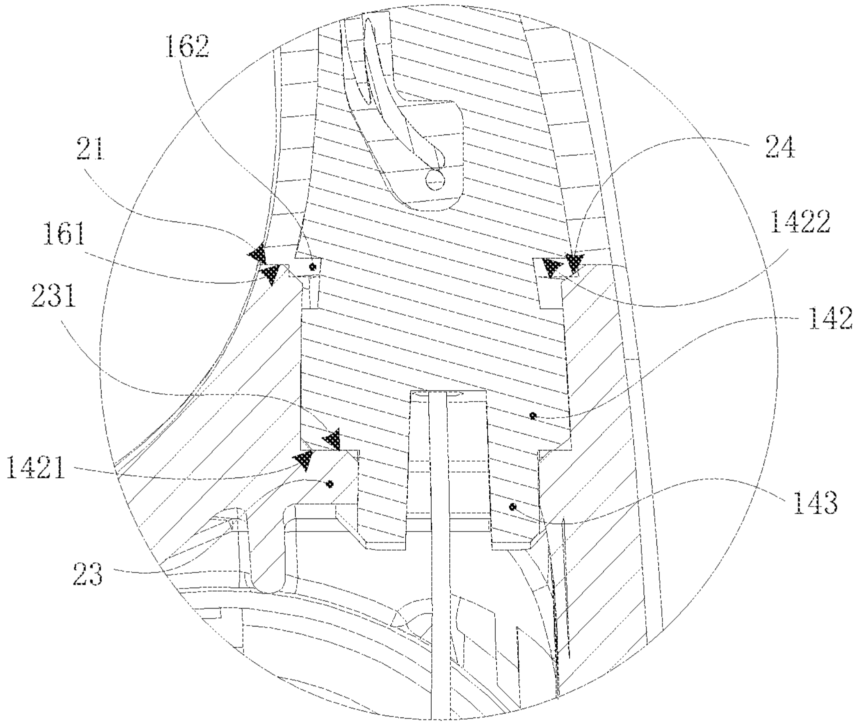
FIG. 5 is partial enlarged view of part B in FIG. 4.
Figure 6:
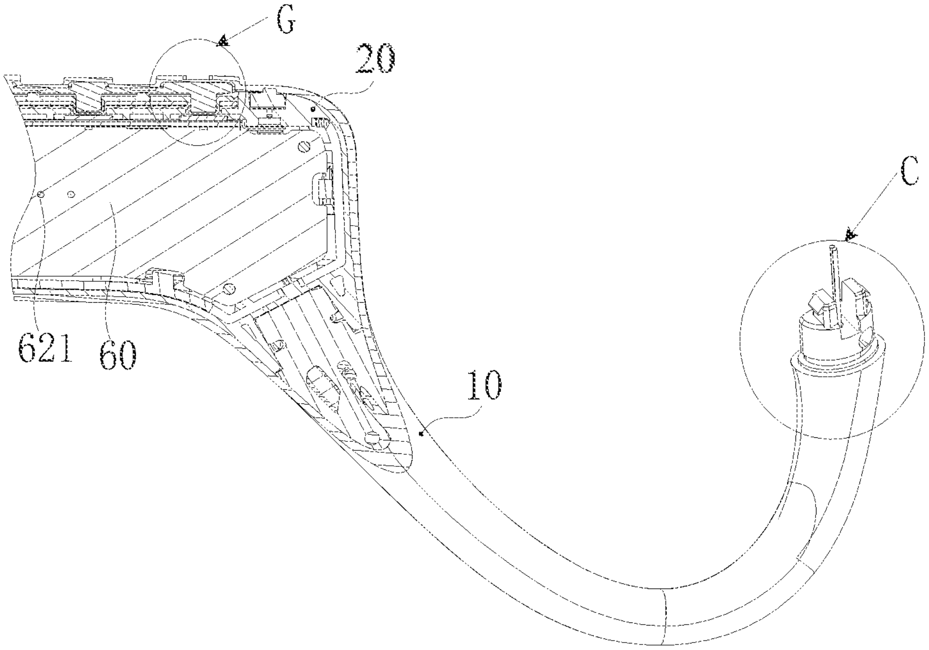
FIG. 6 is a partial structural sectional view of a loudspeaker apparatus according to some embodiments the present disclosure.
Figure 7:
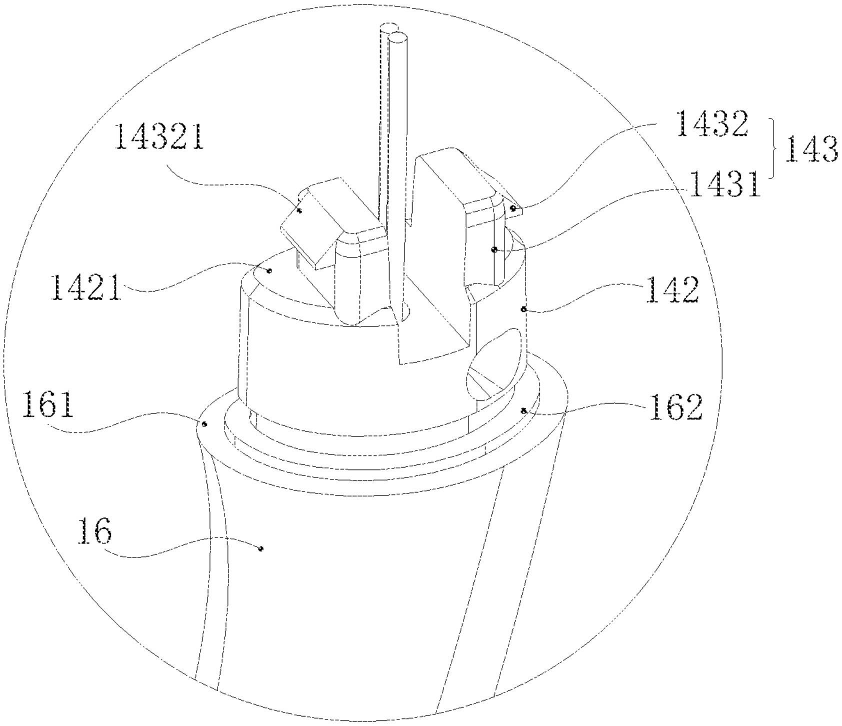
FIG. 7 is a partial enlarged view of part C in FIG. 6.

FIG. 2 is a partial structural diagram of an ear hook of a loudspeaker apparatus according to some embodiments of the present disclosure. FIG. 3 is a partial enlarged view of part A in FIG. 2. FIG. 4 is a partial sectional view of a loudspeaker apparatus according to some embodiments of the present disclosure. FIG. 5 is partial enlarged view of part B in FIG. 4. FIG. 6 is a partial structural sectional view of a loudspeaker apparatus according to some embodiments of the present disclosure. FIG. 7 is a partial enlarged view of part C in FIG. 6. In some embodiments, an outer end surface 21 of the core housings 41 may be an end surface of the core housings 41 facing the ear hooks 10. A plug hole 22 may be configured to provide an accommodating space for the plug-in end 14 to be inserted into the core housings 41 to further realize a fixed plug-in connection of the plug-in end 14 and the core housings 41.

Further, a stopping block 23 may be formed by protruding from an inner sidewall of the plug hole 22 in a direction perpendicular to the inner sidewall. Specifically, the stopping block 23 may be a plurality of block-shaped protrusions arranged at intervals, or may be an annular-shaped protrusion along the inner sidewall of the plug hole 22, which is not specifically limited herein.

The plug-in end 14 may include an insertion part 142 and two elastic hooks 143. Specifically, the insertion part 142 may be at least partially inserted into the plug hole 22 and abut against an outer side surface 231 of the stopping block 23. The shape of the outer sidewall of the insertion part 142 may match the shape of the inner sidewall of the plug hole 22. When the insertion part 142 is at least partially inserted into the insertion hole 22, the outer sidewall of the insertion part 142 may abut against the inner sidewall of the plug hole 22.

It should be noted that the outer side surface 231 of the stopping block 23 may be a side surface of the stopping block 23 facing the ear hooks 10. The insertion part 142 may further include an end surface 1421 facing the core housings 41. The end surface 1421 may match the outer side surface 231 of the stopping block 23. Thus, when the insertion part 142 is at least partially inserted into the plug hole 22, the end surface 1421 of the insertion part 142 may abut against the outer side surface 231 of the stopping block 23.

Specifically, the sectional shape of the plug hole 22 of the core housings 41 may be an elliptical ring or a substantially elliptical ring along the insertion direction perpendicular to the plug-in end 14 with respect to the core housings 41. Correspondingly, the section of the insertion part 142 may be a substantially oval shape that matches the plug hole 22. Certainly, the insertion part 142 and the plug hole 22 may have other shapes, which may be specifically set according to actual needs.

Further, the two elastic hooks 143 may be arranged side by side, spaced apart, and symmetrically arranged on a side of the insertion part 142 facing the inside of the core housings 41 along the insertion direction. Each of the elastic hooks 143 may include a beam part 1431 and a hook part 1432, respectively. The beam part 1431 may be connected to the side of the insertion part 142 facing the core housings 41. The hook part 1432 may be arranged at one end of the beam part 1431 away from the insertion part 142, and extend along the direction perpendicular to the insertion direction. Further, each hook part 1432 may be arranged with a transitional inclined plane 14321 connecting a side surface parallel to the insertion direction and an end surface away from the insertion part 142.

Specifically, during the assembly process of the ear hooks 10 and the core housings 41, the plug-in end 14 may gradually enter the core housings 41 via the plug hole 22. When reaching the position of the stopping block 23, the hook part 1432 of the two elastic hooks 143 may be blocked by the stopping block 23. Under the action of external thrust, the stopping block 23 may gradually squeeze the transitional inclined plane 14321 of the hook part 1432. Thus, the two elastic hooks 143 may be elastically deformed and get closer to each other. When the transitional inclined plane 14321 passes through the stopping block 23 and reaches the side of the stopping block 23 closing to the inside of the core housings 41, the elastic hooks 143 may elastically recover since the absence of blocking of the stopping block 23 and may be clamped in the inner side surface of the stopping block 23 facing the inside of the core housings 41, thereby the stopping block 23 may be clamped between the insertion part 142 and the hook part 1432 of the plug-in end 14, so as to realize the fixed plug-in connection of the core housings 41 and the plug-in end 14.

In some embodiments, after the plug-in end 14 is fixedly plugged in the core housings 41, the insertion part 142 may be partially inserted into the plug hole 22, and the exposed part of the insertion part 142 may be arranged in a stepped shape, thereby forming an annular table 1422 spaced apart from the outer end surface of the core housings 41.

It should be noted that the exposed part of the insertion part 142 refers to a part of the insertion part 142 that is exposed to the core housings 41. Specifically, it refers to a part that is exposed to the core housings 41 and close to the outer end surface of the core housings 41.

In some embodiments, the annular table 1422 may be arranged opposite to the outer end surface 21 of the core housings 41, and the interval between the two refers to the interval along the plug direction and the interval perpendicular to the plug direction.

In some embodiments, the protective sleeve 16 may extend to the side of the annular table 1422 end surface 1422 facing the outer end surface 21 of the core housings 41, fill in the interval between the annular table 1422 and the outer end surface 21 of the core housings 41 when the plug-in end 14 is fixedly plugged in the plug hole 22 of the core housings 41, elastically abut against the core housings 41. Therefore, it may be difficult for external liquid to enter the inside of the core housings 41 from the bonding part between the core housings 41 and the plug-in end 14, and the sealing between the plug-in end 14 and the plug hole 22 may be realized to protect the earphone cores 42 in the core housings 41, so that the waterproof effect of the loudspeaker apparatus may be improved.

In some embodiments, the protective sleeve 16 may form an annular abutting surface 161 on the side of the annular table 1422 facing the outer end surface 21 of the core housings 41. The annular abutting surface 161 may be an end surface of the protective sleeve 16 facing one side of the core housings 41.

In some embodiments, the protective sleeve 16 may also include an annular boss 162 arranged inside the annular abutting surface 161 and protruding from the annular abutting surface 161. Specifically, the annular boss 162 may be specifically formed on one side of the annular abutting surface 161 facing the plug-in end 14, and may be protruding and arranged in a direction toward the core housings 41 relative to the annular abutting surface 161. Further, the annular boss 162 may also be directly formed on a periphery of the annular table 1422 and cover the annular table 1422.

In some embodiments, the core housings 41 may include a connecting inclined surface 24 configured to connect the outer end surface 21 of the core housings 41 and the inner sidewall of the plug hole 22. The connecting inclined surface 24 may be specifically a transitional surface between the outer end surface 21 of the core housings 41 and the inner sidewall of the plug hole 22. The connecting inclined surface 24 may not be located on a same plane as the outer end surface 21 of the core housings 41 and the inner sidewall of the plug hole 22. The connecting inclined surface 24 may be a planar or curved surface, or other shapes according to actual needs, which is not specifically limited herein.

In some embodiments, when the plug-in end 14 is fixedly plugged in the core housing 41, the annular abutting surface 161 and the annular boss 162 may elastically abut the outer end surface of the core housings 41 and the connecting inclined surface 24, respectively.

It should be noted that since the outer end surface 21 of the core housings 41 and the connecting inclined surface 24 are not on the same plane, the elastic abutment between the protective sleeve 16 and the core housings 41 may not be on a same plane, it may be difficult for the external liquid to enter the core housings 41 and further enter the earphone cores 42 via the part between the protective sleeve 16 and the core housings 41, thereby improving the waterproof effect of the loudspeaker apparatus to protect the functional structures therein, and prolonging the life of the loudspeaker apparatus.

In some embodiments, the insertion part 142 may further form an annular groove 1423 adjacent to the annular table 1422 on one side of the annular table 1422 facing the outer end surface 21 of the core housings 41, wherein the annular boss 162 may be formed in the annular groove 1423.

In some embodiments, the annular groove 1423 may be formed on one side of the annular table 1422 facing the core housings 41. In an application scenario, the annular table 1422 may be a sidewall surface of the annular groove 1423 facing one side of the core housings 41. At this time, the annular boss 162 may be formed in the annular groove 1423 along the sidewall surface.

Figure 8:
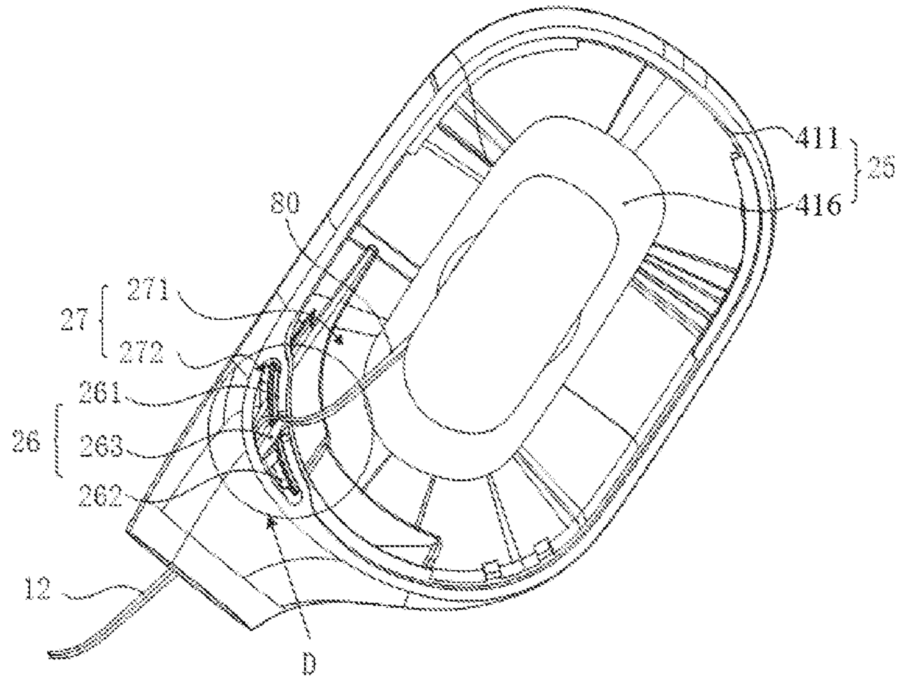
FIG. 8 is a partial structural diagram of a core housing of a loudspeaker apparatus according to some embodiments of the present disclosure.
Figure 9:
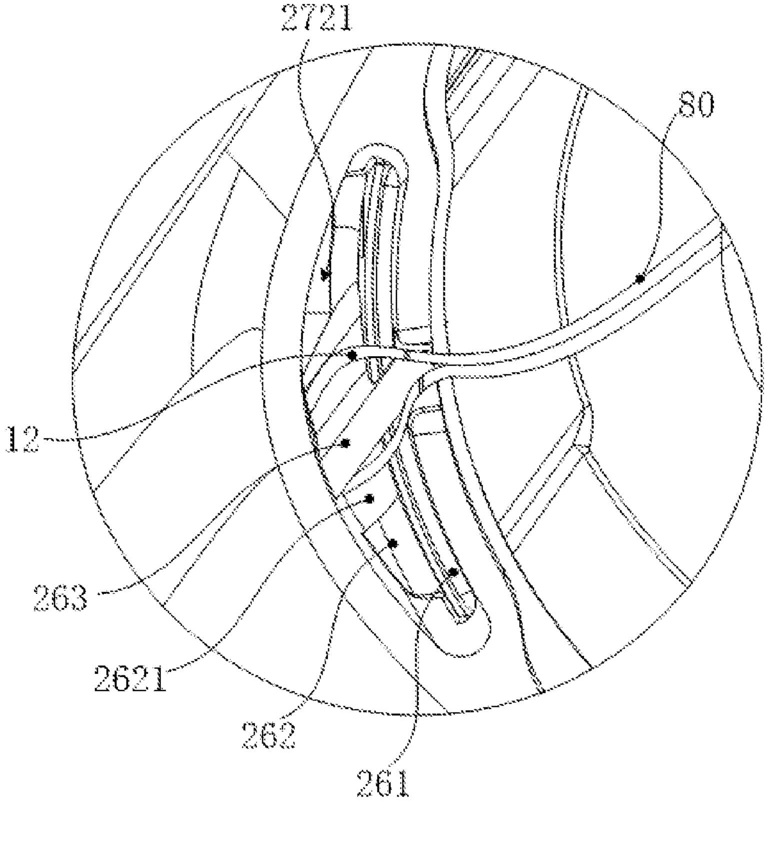
FIG. 9 is a partial enlarged view of part D in FIG. 8.
Figure 10:
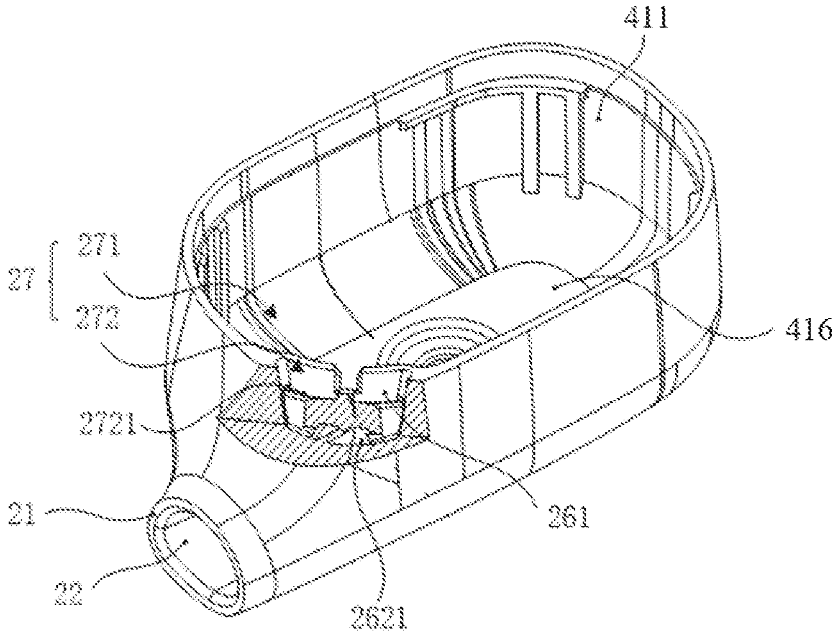
FIG. 10 is a partial sectional view of a core housing of a loudspeaker apparatus according to some embodiments of the present disclosure.

FIG. 8 is a partial structural diagram of a core housing of a loudspeaker apparatus according to some embodiments of the present disclosure. FIG. 9 is a partial enlarged view of part D in FIG. 8. FIG. 10 is a partial sectional view of a core housing of a loudspeaker apparatus according to some embodiments of the present disclosure.

In combination with FIGS. 8-10, the core housings 41 may include a main housing 25 and a baffle assembly 26. The baffle assembly 26 may be arranged inside the main housing 25 and connected to the main housing 25, thereby separating an inner space 27 of the main housing 25 into a first accommodating space 271 and a second accommodating space 272 adjacent to one side of the plug hole 22. In some embodiments, the core housings 41 may also be arranged with a plug hole communicating with the outer end surface of the core housings 41.

In some embodiments, the main housing 25 may include a peripheric sidewall 411 and a bottom wall 416 connected to one end surface of the peripheric sidewall 411. The peripheric sidewall 411 and the bottom wall 416 may jointly surround and form the inner space 27 of the main housing 25.

In some embodiments, the baffle assembly 26 may be arranged on one side of the main housing 25 closing to the plug hole 22, and may include a side baffle 261 and a bottom baffle 262. The side baffle 261 may be arranged in a direction perpendicular to the bottom wall 416, and two ends of the side baffle 261 may be connected to the peripheric sidewall 411, thereby separating the inner space 27 of the main housing 25. The bottom baffle 262 may be arranged parallel or nearly parallel to the bottom wall 416 and spaced apart, and further connected to the peripheric sidewall 411 and the side baffle 261, thereby dividing the inner space 27 formed by the main housing 25 into two parts to form the first accommodating space 271 and the second accommodating space 272. The first accommodating space 271 may be formed and surrounded by the side baffle 261, the bottom baffle 262, the peripheric sidewall 411 away from the plug hole 22, and the bottom wall 416. The second accommodating space 272 may be formed and surrounded by the side baffle 261, the bottom baffle 262, and the peripheric sidewall 411 closing to the plug hole 22. The second accommodating space 272 may be smaller than the first accommodating space 271. The bottom baffle may be configured with a wiring hole.

Certainly, the baffle assembly 26 may also divide the inner space 27 of the main housing 25 in other ways, which is not specifically limited herein.

In some embodiments, the baffle assembly 26 may further include an inner baffle 263, and the inner baffle 263 may further divide the second accommodating space 272 into two sub-accommodating spaces 2721. Specifically, the inner baffle 263 may be arranged perpendicular to the bottom wall 416 of the main housing 25 and connected to the side baffle 261 and the peripheric sidewall 411, and may further extend to a wiring hole 2621, thereby dividing the wiring hole 2621 into two parts when the second accommodating space 272 is divided into two sub-accommodating spaces 2721, the two wiring holes 2621 may further communicate with the corresponding sub-accommodating spaces 2721, respectively.

In some embodiments, the second accommodating space 272 may be further filled with sealant. In this way, a wire 12 and a wire 80 accommodated in the second accommodating space 272 may be further fixed to reduce the adverse effect of the sound quality due to wire vibration, thereby improving the sound quality of the loudspeaker apparatus. At the same time, a welding point between the wire 12 and the wire 80 may be protected. In addition, sealing the second accommodating space 272 may also achieve purpose of waterproof and dustproof.

It should be noted that the descriptions of the earphone cores 42 of the loudspeaker apparatus are merely an example, and should not be considered as the only feasible implementation option. Obviously, for those skilled in the art, after understanding the basic principles of the earphone cores 42 of the loudspeaker apparatus, various modifications and changes may be made in form and details to the specific manners and steps of implementing the earphone cores 42 of the loudspeaker apparatus without departing from this principle, but these modifications and changes may be still within the scope described above. For example, the second accommodating space 272 may also be greater than the first accommodating space 271, or the second accommodating space 272 may be equal to the first accommodating space 271. Such deformations may be still within the scope of the present disclosure.

Figure 11:
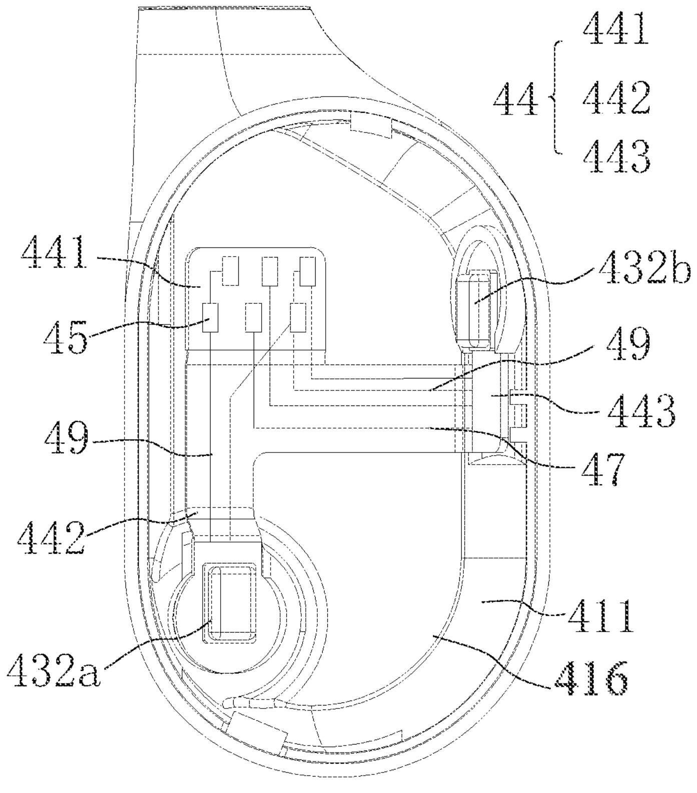
FIG. 11 is a partial structural diagram of a loudspeaker apparatus according to some embodiments of the present disclosure.
Figure 12:
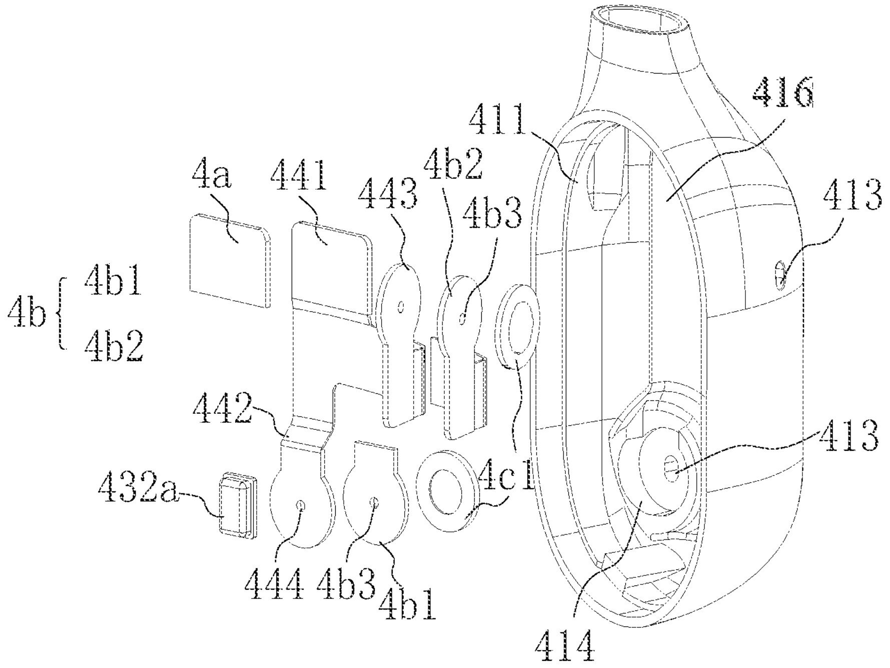
FIG. 12 is a partial exploded structural diagram of a loudspeaker apparatus according to some embodiments of the present disclosure.
Figure 13:
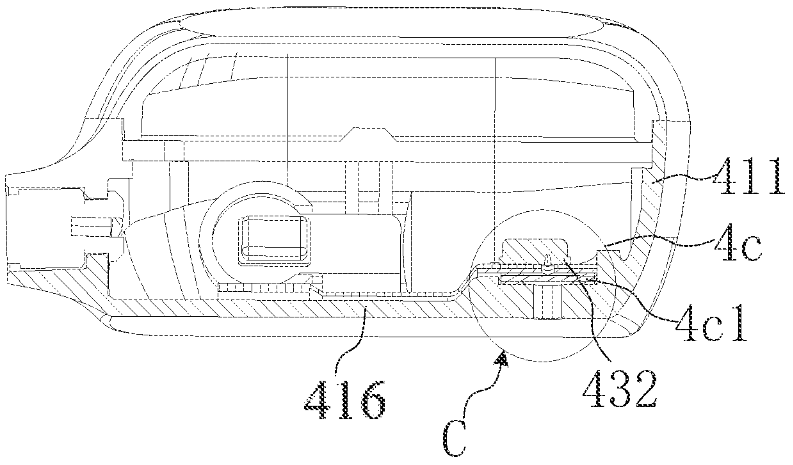
FIG. 13 is a partial sectional view of a loudspeaker apparatus according to some embodiments of the present disclosure.

FIG. 11 is a partial structural diagram of a loudspeaker apparatus according to some embodiments of the present disclosure. FIG. 12 is a partial exploded structural diagram of a loudspeaker apparatus according to some embodiments of the present disclosure, and FIG. 13 is a partial sectional view of a loudspeaker apparatus according to some embodiments of the present disclosure.

According to FIG. 11 and FIG. 12, in some embodiments, the core housings 41 may include an auxiliary function module, and the auxiliary function module may be a module different from the earphone cores 42 and configured to receive an auxiliary signal and perform an auxiliary function. For example, the auxiliary function module may be microphones 432, a button, or the like, which may be specifically set according to actual requirements.

In some embodiments, the auxiliary function module may include the microphones 432. The count of the microphones 432 may be two, which include a first microphone 432*a* and a second microphone 432*b*, respectively. Both of the first microphone 432*a* and the second microphone 432*b* may be micro-electromechanical systems (MEMS), which have a small operating current, relatively stable performance, and generated voice of high quality. The two microphones 432 may be arranged on different positions of a flexible circuit board 44 based on actual needs.

In some embodiments, the flexible circuit board 44 may include a main circuit board 441, a first branch circuit board 442 and a second branch circuit board 443 connected to the main circuit board 441. The auxiliary function module may include at least a first auxiliary function module and a second auxiliary function module, the first auxiliary function module may be arranged on the main circuit board 441, and the second auxiliary function module may be arranged on the first branch circuit board 442. The first branch circuit board 442 may extend in the same direction as the main circuit board 441. In some embodiments, the first branch circuit board 442 may extend away from the main body circuit board 441 along one end of the main circuit board 441. The first microphone 432*a* may be attached and mounted on one end of the first branch circuit board 442 away from the main circuit board 441. The first flexible circuit board 44 may be configured to electrically connect an audio signal wire and an auxiliary signal wire of an external control circuit, and the audio signal wire and the auxiliary signal wire may be electrically connected to the earphone cores 42 and the auxiliary function module through the first flexible circuit board 44, respectively. The second branch circuit board 443 may extend perpendicularly to the main circuit board 441. In some embodiments, the second branch circuit board 443 may extend away from the main circuit board 441 along the other end of the main circuit board 441, and may be spaced apart from the first branch circuit board 442. The second microphone 432*b* may be attached and mounted on one end of the second branch circuit board 443 away from the main circuit board 441, and a plurality of first welding pads 45 may be arranged on one end of the main circuit board 441 away from the first branch circuit board 442 and the second branch circuit board 443. The auxiliary function module may further include a third auxiliary function module arranged on the second branch circuit board 443.

In some embodiments, the core housings 41 may include surrounding peripheric sidewall 411 and the bottom wall 416 corresponding to the outer sidewall and connected to one end surface of the peripheric sidewall 411, thereby forming an accommodating space with an opening at one end. The earphone core 42 may be arranged in the accommodating space via the end with an opening, the first microphone 432*a* may be fixed to the bottom wall 416, and the second microphone 432*b* may be fixed to the peripheric sidewall 411.

In some embodiments, the first branch circuit board 442 and/or the second branch circuit board 443 may be bent appropriately to adapt to the location of a sound-inlet hole corresponding to the microphones 432 on the core housings 41. Specifically, the flexible circuit board 44 may be arranged inside the core housings 41 in such a way that the main circuit board 441 is parallel to the bottom wall 416, such that the first microphone 432*a* may correspond to the bottom wall 416 without bending the main circuit board 441. Since the second microphone 432*b* is fixed to the peripheric sidewall 411 of the core housings 41, it is needed to bend a second main circuit board 441. Specifically, one end of the second branch circuit board 443 away from the main circuit board 441 may be bent. Thus, the board surface of the second branch circuit board 443 may be perpendicular to the board surface of the main circuit board 441 and the first branch circuit board 442, and the second microphone 432*b* may be fixed to the peripheric sidewall 411 of the core housings 41 toward a direction away from the main circuit board 441 and the first branch circuit board 442. In some embodiments, the first branch circuit board 442 may be arranged facing the bottom wall 416, and the second branch circuit board 443 may be arranged facing the peripheric sidewall 411. The second auxiliary function module may include a first microphone element, the third auxiliary function module may include a second microphone element, the first microphone element may be arranged on one side of the first branch circuit board 442 facing the bottom wall 416, and the second microphone element may be arranged on one side of the second branch circuit board 443 facing the peripheric sidewall 411.

In some embodiments, the first welding pad 45, the first microphone 432*a*, and the second microphone 432*b* may be arranged on a same side of the flexible circuit board 44.

In some embodiments, the other side of the flexible circuit board 44 may be equipped with a rigid support board 4*a* configured to support the first welding pad 45, and a microphone rigid support board **4*b*. The microphone rigid support board 4*b* may include a rigid support board 4*b*1 configured to support the first microphone 432*a* and a rigid support board 4*b*2 configured to support the second microphone 432*b***.

In some embodiments, the rigid support board **4*a*, the rigid support board 4*b*1, and the rigid support board 4*b*2 may be mainly configured to support the corresponding welding pad and the microphones 432, thereby having certain strengths. Materials of the three rigid support boards may be the same or different and may be polyimide film (PI), or other materials that may facilitate a strong support, such as polycarbonate, polyvinyl chloride, or the like. In addition, the thickness of the three rigid support boards may be set according to the strengths of the rigid support boards themselves and the actual intensities that the first welding pad 45, the first microphone 432*a*, and the second microphone 432*b*** need, which is not specifically limited herein.

The first microphone **432*a* and the second microphone 432*b* may correspond to two microphone assemblies 4*c*, respectively. In some embodiments, the structure of the two microphone assemblies 4*c* may be the same. The sound-inlet hole 413 may be arranged on the core housings 41, further, and the loudspeaker apparatus may be also equipped at the core housings 41 with an annular retaining wall integrally formed on the inner surface of the core housings 41, the annular retaining wall may be arranged on a periphery of the sound-inlet hole 413, thereby defining an accommodating space 415 communicating with the sound-inlet hole 413**.

According to FIGS. 11, 12, and 13, in some embodiments, the microphone assembly **4*c* may also include a waterproof membrane assembly 4*c*1**.

The waterproof membrane assembly **4*c*1 may be arranged inside the accommodating space 415 and cover the sound-inlet hole 413. The microphone rigid support board 4*b* may be arranged inside the accommodating space 415 and may be arranged on one side of the waterproof membrane assembly 4*c*1 away from the sound-inlet hole 413 to press the waterproof membrane assembly 4*c*1 against the inner surface of the core housings 41. In some embodiments, the microphone rigid support board 4*b* may be arranged with a sound-inlet hole 4*b*3 corresponding to the sound-inlet hole 413. In some embodiments, the microphones 432 may be arranged on one side of the microphone rigid support board 4*b* away from the waterproof membrane assembly 4*c*1 and cover the sound-inlet hole 4*b*3**.

The waterproof membrane assembly **4*c*1 may have the function of waterproofing and sound-transmitting, and may be closely attached to the inner surface of the core housings 41 to prevent the liquid outside the core housings 41 from entering the inside of the core housings 41 via the sound-inlet hole 413 and affecting the performance of the microphones 432**.

The axial direction of the sound-inlet hole **4*b*3 and the sound-inlet hole 413 may be coincide, or may be intersected at a certain angle according to actual needs of the microphones 432**, or the like.

It should be noted that the sound-inlet holes in the present embodiments mentioned above refer to a sound receiving structure of the core housings 41.

The microphone rigid support board **4*b* may be arranged between the waterproof membrane assembly 4*c*1 and the microphones 432, on one hand, and the waterproof membrane assembly 4*c*1 may be pressed and held, thus the waterproof membrane assembly 4*c*1 may be closely attached to the inner surface of the core housings 41, on the other hand, the microphone rigid support board 4*b* may have a certain strength, thereby supporting of the microphones 432**.

In some embodiments, the material of the microphone rigid support board **4*b* may be polyimide film (PI), or other materials that may have a function of strength support, such as polycarbonate, polyvinyl chloride, or the like. In addition, the thickness of the microphone rigid support board 4*b* may be set according to the strength of the microphone rigid support board 4*b* and the actual strength required by the microphones 432**, which is not specifically limited herein.

Figure 14:
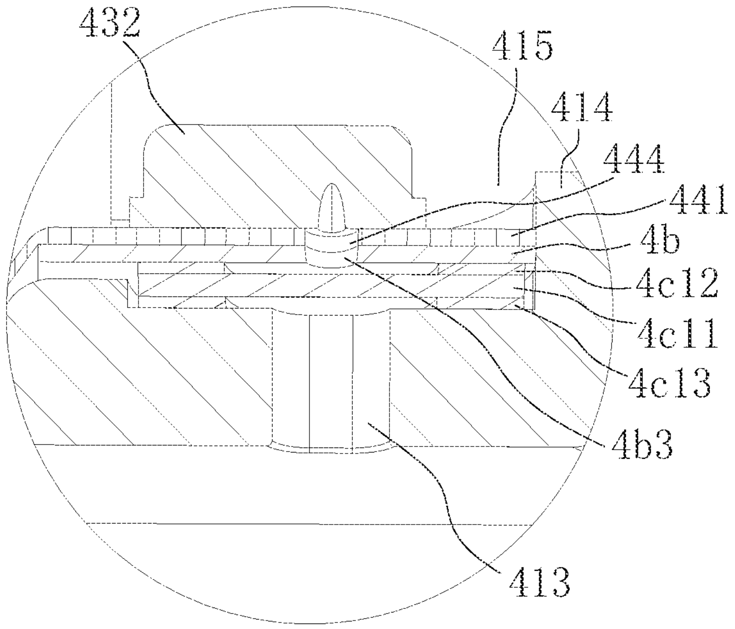
FIG. 14 is a partial enlarged view of part C in FIG. 13.

FIG. 14 is a partial enlarged view of part C in FIG. 13. As shown in FIG. 14, in some embodiments, the waterproof membrane assembly **4*c*1 may include a waterproof membrane body 4*c*11 and an annular rubber pad 4*c*12. The annular rubber pad 4*c*12 may be arranged on one side of the waterproof membrane body 4*c*11 facing the microphone rigid support board 4*b*, and may be further arranged at the periphery of the sound-inlet hole 413 and the sound-inlet hole 4*b*3**.

The microphone rigid support board **4*b* may press against the annular rubber pad 4*c*12, thus the waterproof membrane assembly 4*c*1 and the microphone rigid support board 4*b*** may be bonded and fixed together.

In some embodiments, the annular rubber pad **4*c*12 may be arranged between the waterproof membrane body 4*c*11 and the rigid support board to form a sealed cavity connected to the microphones 432 only via the sound-inlet hole 4*b*3, that is, the connection between the waterproof membrane assembly 4*c*1 and the microphone rigid support board 4*b* may not have a gap. Thus, the outer space of the annular rubber pad 4*c*12 between the waterproof membrane body 4*c*11 and the microphone rigid support board 4*b* may be isolated from the sound-inlet hole 4*b*3**.

In some embodiments, the waterproof membrane body **4*c*11 may specifically be a waterproof sound-permeable membrane, which is equivalent to the tympanic membrane of a human ear. When an external sound enters via the sound-inlet hole 413, the waterproof membrane body 4*c*11 may vibrate, resulting in a change in the air pressure in the sealed cavity, which makes the microphones 432** to generate sound.

Further, since the waterproof membrane body **4*c*11 causes changes in the air pressure in the sealed cavity during vibration, the air pressure may need to be controlled in an appropriate range. If it is too large or too small, it may affect the sound quality. In the present embodiment, the space between the waterproof membrane body 4*c*11 and the rigid support board may be 0.1-0.2 mm, which may be 0.1 mm, 0.15 mm, 0.2 mm, or the like, such that the air pressure change in the sealed cavity caused by the vibration of the waterproof membrane body 4*c*11** may be within an appropriate range, thereby increasing the quality of sound.

In some embodiments, the waterproof membrane assembly **4*c*1 may further include an annular rubber pad 4*c*13 arranged on one side of the waterproof membrane body 4*c*11 facing the inner surface of the core housings 41, and the annular rubber pad 4*c*13 and the annular rubber pad 4*c*12** may overlap.

In this way, the waterproof membrane assembly **4*c*1 may be closely attached to the inner surface of the core housings 41 surrounding the sound-inlet hole 413, thereby reducing the loss of sound entering the sound-inlet hole 413, and improving the conversion of sound into the vibration of the waterproof membrane body 4*c*11**.

In some embodiments, it is also possible to further apply the sealant to the periphery of the annular retaining wall 414 and the microphones 432, thereby increasing the conversion of the sound and the quality of sound.

In some embodiments, the flexible circuit board 44 may be arranged between the rigid support board and the microphones 432, and the sound-inlet hole 444 may be arranged at a position corresponding to the sound-inlet hole **4*b*3 of the microphone rigid support board 4*b*, thereby enabling the vibration of the waterproof membrane body 4*c*11 caused by the external sound to pass through the sound-inlet 444 to further affect the microphones 432**.

In some embodiments, the flexible circuit board 44 may further extend in a direction away from the microphones 432 to connect to other functional elements or wires to achieve corresponding functions. Correspondingly, the microphone rigid support board **4*b* may also extend with the flexible circuit board in the direction away from the microphones 432**.

Correspondingly, the annular retaining wall 414 may be arranged with a gap that matches the shape of the flexible circuit board to allow the flexible circuit board to extend from the accommodating space 415. In addition, the sealant may be further filled into the gap to further improve the sealing performance.

It should be noted that the descriptions of the microphone of the loudspeaker apparatus are merely an example, and should not be considered as the only feasible implementation option. Obviously, for those skilled in the art, after understanding the basic principles of the microphone of the loudspeaker apparatus, various modifications and changes may be made in form and details to the specific manners and steps of implementing the microphone of the loudspeaker apparatus without departing from the principle, but these modifications and changes are still within the scope described above. For example, the annular rubber pad **4*c*12 and the annular rubber pad 4*c*13** may be double-sided tapes, sealants, or the like. Such deformations are all within the scope of the present disclosure.

Further, in some embodiments, the loudspeaker apparatus may further include button modules **4*d*, an auxiliary function module mounted on the flexible circuit board 44 may include a button. The button and the microphones 432 may be arranged at different positions of the core housings 41**, respectively.

Figure 15:
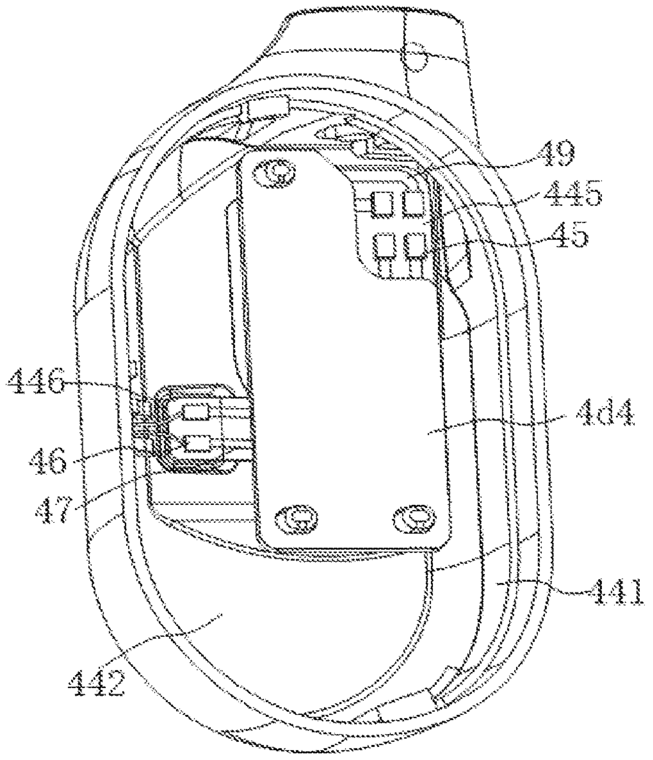
FIG. 15 is a partial structural diagram of a loudspeaker apparatus according to some embodiments of the present disclosure.
Figure 16:
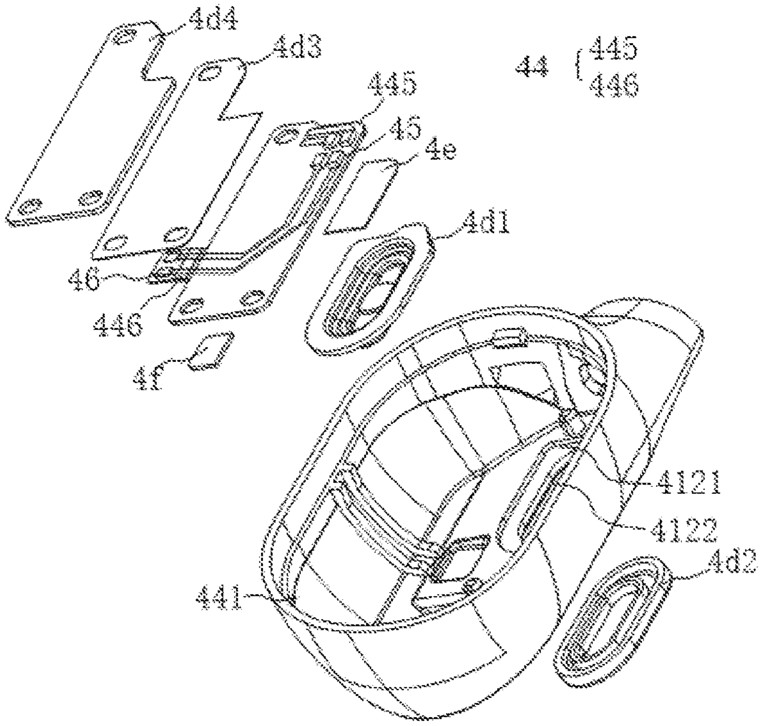
FIG. 16 is a partial exploded structural diagram of a loudspeaker apparatus according to some embodiments of the present disclosure.
Figure 17:
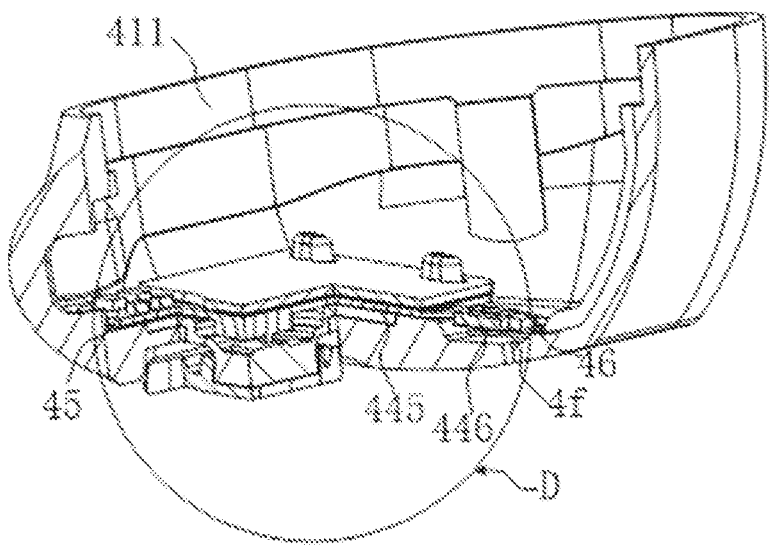
FIG. 17 is a partial sectional view of a loudspeaker apparatus according to some embodiments of the present disclosure.
Figure 18:
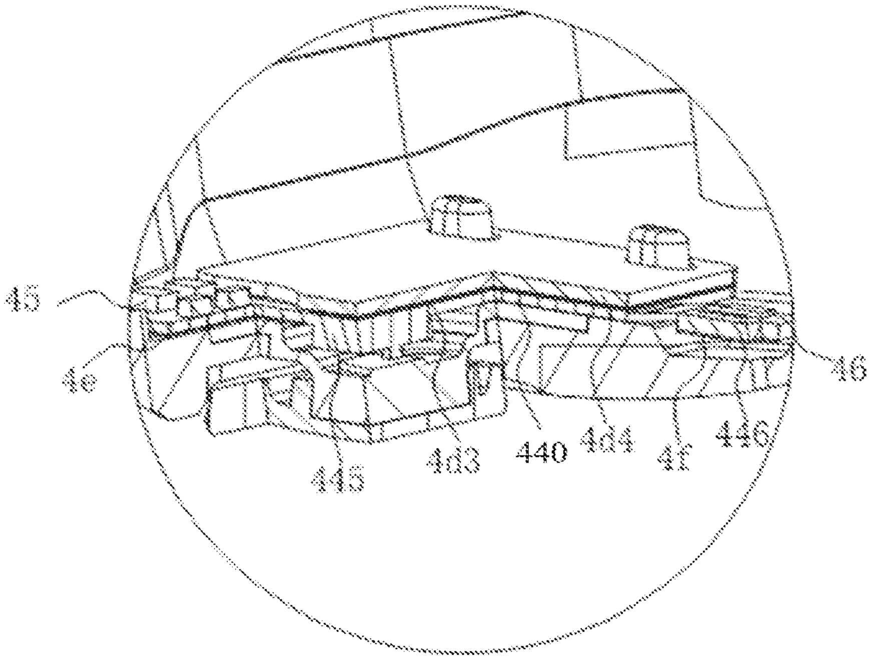
FIG. 18 is a partial enlarged view of part D in FIG. 17.
Figure 19:
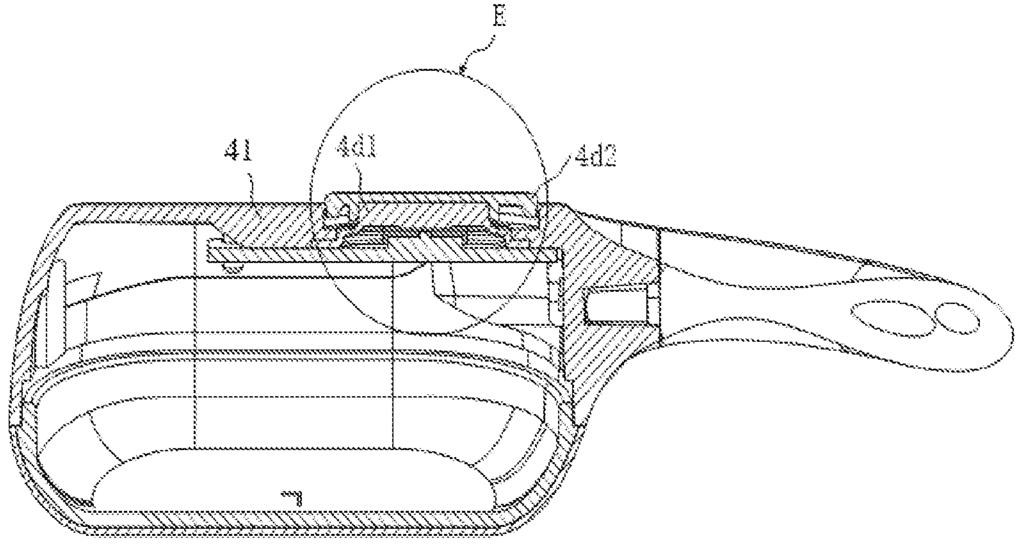
FIG. 19 is a partial sectional view of a loudspeaker apparatus according to some embodiments of the present disclosure.
Figure 20:
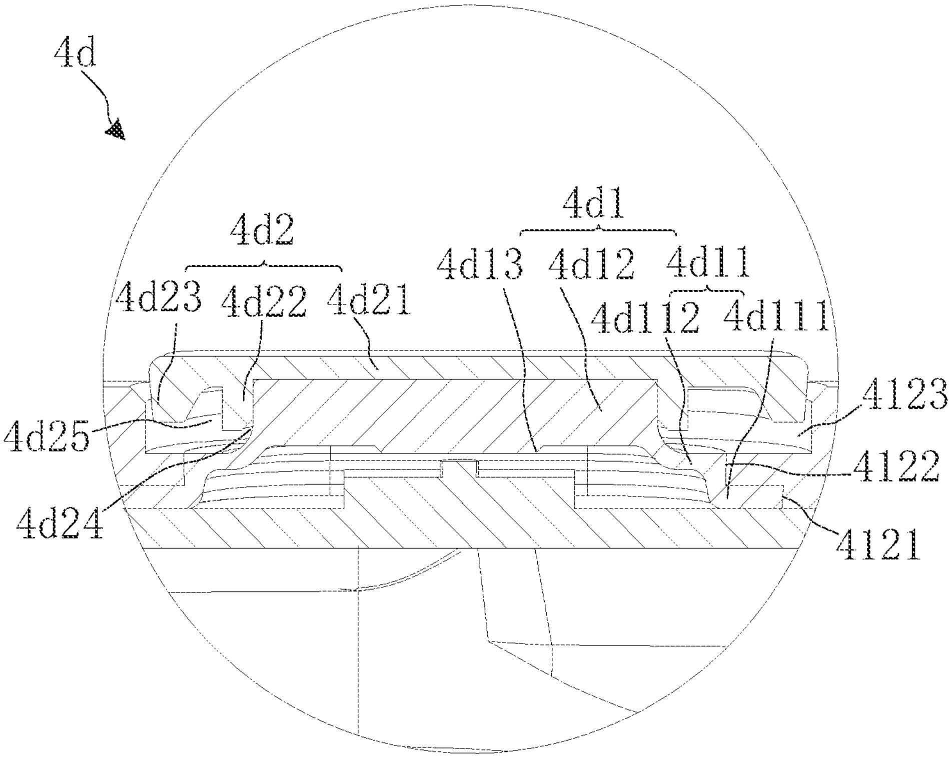
FIG. 20 is a partial enlarged view of part E in FIG. 19.

FIG. 15 is a partial structural diagram of a loudspeaker apparatus according to some embodiments of the present disclosure. FIG. 16 is a partial exploded structural diagram of a loudspeaker apparatus according to some embodiments of the present disclosure. FIG. 17 is a partial sectional view of a loudspeaker apparatus according to some embodiments of the present disclosure. FIG. 18 is a partial enlarged view of part D in FIG. 17. FIG. 19 is a partial sectional view of a loudspeaker apparatus according to some embodiments of the present disclosure. FIG. 20 is a partial enlarged view of part E in FIG. 19.

According to FIGS. 15, 16, and 20, in some embodiments, the flexible circuit board 44 may be disposed in the core housings 41, and the outer side of the core housings 41 may be equipped with the button modules **4*d* matching the flexible circuit board. In some embodiments, correspondingly, the flexible circuit board 44 may include the main circuit board 445 and the branch circuit board 446, wherein the branch circuit board 446 may extend in a direction perpendicular to the main circuit board 445. A plurality of first welding pads 45 may be arranged on an end of the branch circuit board 445 away from the branch circuit board 446. The button may be attached and mounted on the main circuit board 445, and the second welding pad 46 may be arranged on the end of the branch circuit board 446 away from the main circuit board 445**.

It should be noted that the circuit boards in the present embodiments mentioned above refer to a structure for integrating electronic elements.

In some embodiments, the core housings 41 may include the surrounding peripheric sidewall 411 and the bottom wall 416 connected to one end surface of the peripheric sidewall 411, thereby forming an accommodating space with an opening at one end. The board surface of the flexible circuit board 44 may be arranged in parallel to or spaced apart from the bottom wall 416. Thus, the button may be arranged facing the bottom wall 416 of the core housings 41.

In some embodiments, the button may be arranged on one side of the flexible circuit board 44 facing the bottom wall 416. In order to facilitate assembly, the first welding pad 45 and the second welding pad 46 may be arranged on one side of the flexible circuit board 44 away from the bottom wall 416, thus, the first welding pad 45 and the second welding pad 46 may be arranged on two sides of the flexible circuit board 44, respectively.

According to FIGS. 16, 17, and 18, in some embodiments, the main circuit board 445 may be arranged with a rigid support board **4*d*3 on one side away from the button for supporting the button and maintaining the first welding pad 45 exposed. A rigid support board 4*e* for supporting the first welding pad 45 and maintaining the button exposed may be arranged on one side away from the first welding pad 45, and the branch circuit board 446 may be arranged with a rigid support board 4*f* for supporting the second welding pad 46 on one side away from the second welding pad 46**.

In some embodiments, the button and the first welding pad 45 may be arranged on two sides of the main circuit board 445, respectively, and may be arranged at intervals on two sides of the main circuit board 445. Accordingly, the rigid support board **4*d*3 corresponding to the button and the rigid support board 4*e* corresponding to the first welding pad 45 may be arranged on two sides of the main circuit board 445, respectively, and may further bypass the button and the first welding pad 45, respectively. Thus, the rigid support board 4*d*3 corresponding to the button and the rigid support board 4*e* corresponding to the first welding pad 45 may have neighboring edges arranged adjacently. In some embodiments, the rigid support board 4*d*3 may be further arranged with a rigid support board 4*d*4. The rigid of the rigid support board 4*d*4 may be larger than the rigid of the rigid support board 4*d*3, and the rigid support board 4*d*3** may correspond to the button.

In some embodiments, the inner surface of the core housings 41, specifically the inner surface of the bottom wall 416, may be arranged with a depression area 4121, further, a button hole 4122 may be arranged on the depression area 4121 and configured to communicate with the inner surface and outer surface of the core housings 41. The depression area 4121 may be formed by depressing the inner surface of the core housings 41 toward the outside of the core housings 41. The button hole 4122 may be further arranged in the intermediate part of the depression area 4121, or other parts according to actual needs.

According to FIGS. 16, 19, and 20, in some embodiments, the button modules **4*d* may also include an elastic bearing pedestal 4*d*1 and a button 4*d*2. In some embodiments, the outer sidewall may be configured with the button hole 4122 configured to cooperate with the button 4*d*2. In some embodiments, the elastic bearing pedestal 4*d*1 may include an integrally formed bearing pedestal body 4*d*11 and a support column 4*d*12. The bearing pedestal body 4*d*11 may be arranged in the depression area 4121 and fixed to the bottom of the depression area 4121. Specifically, the bottom of the depression area 4121 refers to an inner wall surface of the depression area 4121 away from the inside of the core housings 41. The support column 4*d*12 may be arranged on one side of the bearing pedestal body 4*d*11 facing the outside the core housings 41 and exposed out of the button hole 4122. In some embodiments, a button may be arranged on the exposed part of the support column 4*d*12**.

The elastic bearing pedestal **4*d*1 may be arranged in the depression area 4121 and fixed to the bottom of the depression area 4121, and may cover the button hole 4122 from the inner side of the core housings 41 via the bearing pedestal body 4*d*11 to space apart the inside and the outside of the core housings 41. Therefore, it may be difficult for external liquid to enter the inside of the core housings 41 via the button hole 4122, thereby implementing the waterproof and protection for the internal components of the core housings 41**.

In some embodiments, the elastic bearing pedestal **4*d*1 may be fixed to the bottom of the depression area 4121 in an attaching way through the bearing pedestal body 4*d*11. Specifically, glue, double-sided tape, or the like, may be applied between the surface of the bearing pedestal body 4*d*11 facing the outside of the core housings 41 and the bottom of the depression area to stick the surface of the bearing pedestal body 4*d*11 facing the outside of the core housings 41** and the bottom of the depression area together.

In some embodiments, the bearing pedestal body **4*d*11 may be fixed to the bottom of the depression area 4121 by an injection molding. The surface of the bearing pedestal body 4*d*11 facing the outside of the core housings 41 and the bottom of the depression area 4121 of the core housings 41 may be integrally formed by injection molding, which may be formed by encapsulation. In the present embodiment, the elastic bearing pedestal 4*d*1 and the bottom of the depression area 4121 of the core housings 41 may be integrally formed by injection molding, thereby making the binding between the elastic bearing pedestal 4*d*1 and the bottom of the depression area 4121 of the core housings 41 stronger, increasing the binding strength between the elastic bearing pedestal 4*d*1 and the bottom of the depression area 4121 of the core housings 41 and improving the sealing of the core housings 41, therefore, on one hand, the entire button modules 4*d* may be more stable and reliable, and on the other hand, the waterproof effect of the core housings 41** may be further improved.

In some embodiments, the bearing pedestal body **4*d*11 may include an annular fixing part 4*d*111 and an elastic support part 4*d*112. The annular fixing part 4*d*111 may be arranged around the button hole 4122 and attached and fixed to the bottom of the depression area 4121, thereby fixing the elastic bearing pedestal 4*d*1 to the core housings 41**.

The elastic support part **4*d*112 may be connected to an inner ring-shaped surface of the annular fixing part 4*d*111 and bulging in a dome shape facing the outside of the core housings 41, thus, a certain height may exist between the top and the bottom in the pressing direction of the button 4*d*2, and the size of the top along the direction perpendicular to the pressing direction may be smaller than the bottom. The support column 4*d*12 may be arranged at the top of the elastic support part 4*d*112. When the button 4*d*2 is pressed, the top of the elastic support part 4*d*112 may be pressed, and the top of the elastic support part 4*d*112 may move toward the direction closing to the bottom. Thus, the button 4*d*2 may be driven to move in the direction of the button hole 4122** until the button is triggered.

It should be noted that since the overall structure of the loudspeaker apparatus is small, the connection between the components may be relatively tight, thus the pressing stroke of the button **4*d*2 to the button may be small, thereby weakening the pressing touch of the button 4*d*2. In the present embodiment, since the elastic support part 4*d*112 may be bulging in a dome shape facing the outside of the housings 41, the distance between the button 4*d*2 and the button inside the core housings 41 may be increased, thereby increasing the pressing stroke of the button 4*d*2 to trigger the button, so as to improve the hand feeling of the user pressing the button 4*d*2**.

Specifically, the bottom of the elastic support part **4*d*112 may be fixed to the sidewall surface of the button hole 4122, thus the top of the elastic support part 4*d*112 may be exposed from the button hole 4122, thereby, the support column 4*d*12 arranged at the end of the elastic support part 4*d*112 facing the outside of the core housings 41 may be completely exposed to the outside of the core housings 41, and may be further fixed with the button 4*d*2 on the outside of the core housings 41. In some embodiments, a depression area 4123 may be arranged on the outer surface of the core housings 41. The button hole 4122 may be further arranged in the depression area 4123. The depression area 4121 and the depression area 4123 may be arranged at two ends of the button hole 4122, respectively, and may be penetrated by the button hole 4122. The shapes, sizes, or the like, of the depression area 4121 and the depression area 4123 may be set to be the same or different depending on the actual needs. In addition, the count of the depression area 4121 and the depression area 4123 may be the same, and the count of the depression area 4121 and the depression area 4123 may be determined according to the count of the button 4*d*2, and may be one or more. One or more button holes 4122 may be arranged in each depression area 4121 and depression area 4123, which is not specifically limited herein. In the present embodiment, the count of button 4*d*2 corresponding to the core housings 41 may be one, and the button 4*d*2 may correspond to a depression area 4121 and a depression area 4123**.

In some embodiments, the support column **4*d*12 may be supported by the elastic support part 4*d*112 to the side of the button hole 4122 facing the outside of the core housings 412 and may be arranged in the depression area 4123. Further, the button 4*d*2 may be arranged on the side of the elastic support part 4*d*112 of the support column 4*d*12. In the present embodiment, by setting the height of the elastic support part 4*d*112 and the support column 4*d*12 along the pressing direction of the button 4*d*2, the button 4*d*2 may be at least partially sunk in the depression area 4123 to improve the space utilization rate and reduce the space occupied by the button modules 4*d***.

In some embodiments, the button **4*d*2 may include a button body 4*d*21, an annular flange 4*d*22 and an annular flange 4*d*23 arranged on one side of the button body 4*d*21. The annular flange 4*d*22 and the annular flange 4*d*23 may be specifically arranged on the opposite side of the pressing surface of the button body 4*d*21**.

In some embodiments, the annular flange **4*d*22 may be arranged in the middle area of the button body 4*d*21, and the annular flange 4*d*23 may be arranged at the outer edge the button body 4*d*21, the annular flange 4*d*22 and the annular flange 4*d*23 may be formed to protrude toward the direction away from the pressing surface of the button body 4*d*21, thereby a cylindrical accommodating space 4*d*24 surrounded by the annular flange 4*d*22 may be formed, and a cylindrical accommodating space 4*d*25 surrounded by the annular flange 4*d*22 and the annular flange 4*d*23 may be formed. The height of the annular flange 4*d*22 and the annular flange 4*d*23 relative to the button body 4*d*2 may be equal or unequal. In the present embodiment, the protrusion height of the annular flange 4*d*22 relative to the button body 4*d*21 may be greater than the protrusion height of the annular flange 4*d*23 relative to the button body 4*d*21**.

In some embodiments, the support column 4*d*12 may be inserted inside the annular flange 4*d*22, i.e., accommodated in the accommodating space 4*d*24. Specifically, the support column 4*d*12 may be fixed with the annular flange 4*d*22 by bonding, injection molding, elastic abutment, or the like.

In some embodiments, the end surface of the annular flange 4*d*23 away from the button body 4*d*21 may be sunk in the depression area 4123 and spaced a certain distance from the bottom of the depression area 4123 when the elastic bearing pedestal 4*d*1 is in a natural state.

In some embodiments, the bottom of the depression area 4123 refers to the inner wall surface of the depression area 4123 facing the core housings 41. Specifically, when the elastic bearing pedestal 4*d*1 is in a natural state, the top of the elastic support part 4*d*112 of the elastic bearing pedestal 4*d*1 may move in a direction toward inside the core housings 41 by pressing the pressing surface of the button 4*d*2. The button may be triggered before the end surface of the annular flange 4*d*23 away from the button body 4*d*21 touches the bottom of the depression area 4123.

In some embodiments, the elastic bearing pedestal 4*d*1 may further include a contact head 4*d*13 configured to contact the button. The contact head 4*d*13 may be arranged on one side of the bearing pedestal body 4*d*11 closing to the core housings 41. Specifically, the contact head 4*d*13 may be arranged in the middle area of the inner wall surface facing the inside of the core housings 41 on the top of the elastic support part 4*d*112, and protrude toward the inside of the core housings 41 with respect to the inner wall surface.

When the button 4*d*2 is pressed, the top of the elastic support part 4*d*112 of the elastic bearing pedestal 4*d*1 may move in a direction toward the inside of core housings 41, thereby driving the contact head 4*d*13 to move toward the button inside the core housings 41, triggering the button via the contact head 4*d*13 to achieve corresponding functions. In this way, the pressing stroke of the button 4*d*2 may be reduced according to actual needs.

It should be noted that the descriptions of the loudspeaker apparatus are merely an example, and should not be considered as the only feasible implementation option. Obviously, for those skilled in the art, after understanding the basic principles of the loudspeaker apparatus, various modifications and changes may be made in forms and detail to the manners and steps of implementing the loudspeaker apparatus without departing from the principle, but the modifications and changes are still within the scope described above. For example, the count of the sound-inlet hole 413 may be set to one or more. Such deformations are within the scope of the present disclosure.

Figure 21:
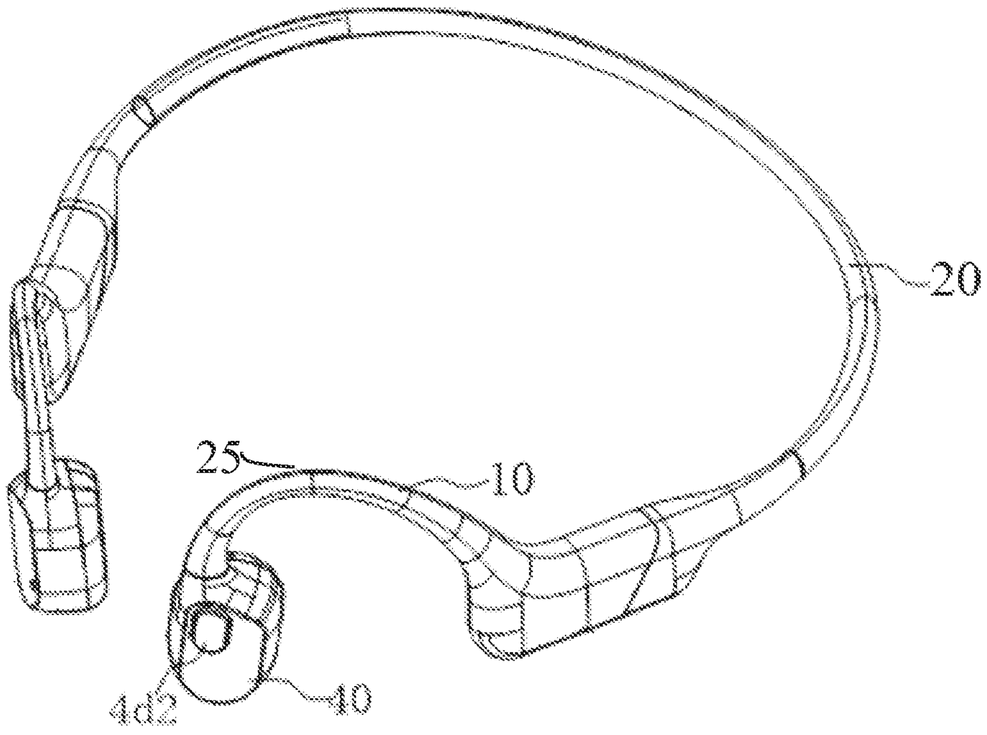
FIG. 21 is a structural diagram of a loudspeaker apparatus according to some embodiments of the present disclosure.
Figure 22:
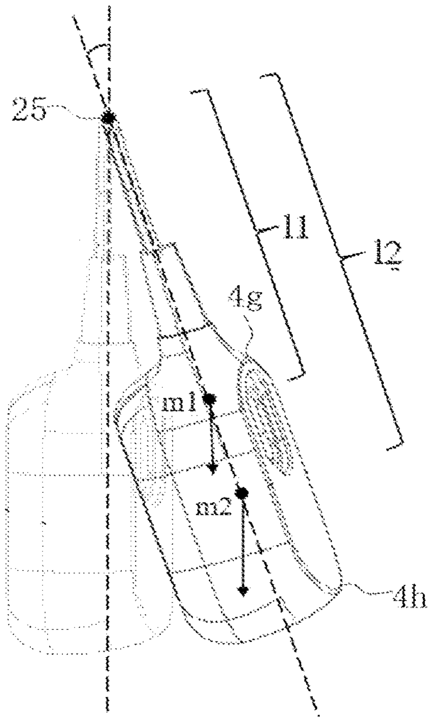
FIG. 22 is a structural diagram of a loudspeaker assembly according to some embodiments of the present disclosure.

Referring to FIGS. 21-22, FIG. 21 is a structural diagram of a loudspeaker apparatus according to some embodiments of the present disclosure. FIG. 22 is a structural diagram of a loudspeaker assembly of a loudspeaker apparatus according to some embodiments of the present disclosure. The loudspeaker apparatus may transmit sound to the human auditory system via bone conduction or air conduction, thereby facilitating the auditory sense of the user. In some embodiments, the loudspeaker apparatus may further include a support connection member 100 and at least one loudspeaker assembly 40 arranged on the support connection member 100. It should be noted that the support connection member 100 may include the circuit housings, the ear hooks and the rear in the present embodiments mentioned above, and the core housings 41 may be fixedly connected with the support connection member 100. A connection part of the support connection member 100 and the core housing 41 may have a central axis, an extension line of the central axis may have a projection on a plane that the outer sidewall of the button module 4*d* is arranged, and an angle between the projection and the major-axis direction of the button module 4*d* may be less than 10°. The control circuit or the battery may be accommodated in the support connection member 100, wherein the control circuit or the battery may drive the earphone core to vibrate to generate sound.

When a user wears the ear hooks 10, the two ear hooks 10 may correspond to the left and right ears of the user, respectively, and the rear hook 30 may correspond to the back side of the user's head, which jointly enable the loudspeaker apparatus to be fixedly attached to the user's head. The support connection member 100 may be configured to contact the user's head, one or more contact points between the support connection member 100 and the user's head (i.e., one or more points near the top 25 of the ear hook) may serve as a vibration fulcrum when the loudspeaker assembly 40 vibrates. A distance between a center of the button module 4*d* and one of the at least one contact point is not greater than a distance between a center of the core housing 41 and one of the at least one contact point.

In some embodiments, the vibration of the loudspeaker assembly 40 may be regarded as a reciprocating swing motion that takes the top 25 of the ear hooks as the fixed point, and the part of the ear hook between the top 25 of the ear hooks and the loudspeaker assembly 40 as the arm rod. The fixed point may be regarded as the vibration fulcrum. The swing amplitude of the loudspeaker assembly 40 (i.e., the vibration acceleration) may be positively correlated with the generated volume thereof. The mass distribution of the loudspeaker assembly 40 may have a significant impact on the reciprocating swing motion, which in turn affects the volume generated by the loudspeaker assembly 40.

In some embodiments, the loudspeaker assembly 40 may include loudspeaker modules (not shown in the figure) and the button modules 4*d*. In particular, the count of the loudspeaker modules may be two, which may be arranged in the two loudspeaker assemblies on the left and right side, respectively. In some embodiments, the loudspeaker modules may be a part other than the button modules 4*d* of the loudspeaker assembly 40, which includes, for example, the earphone cores 42 and the core housings 41.

In some embodiments, the button modules 4*d* may be configured to perform human-machine interaction. For example, implementation of pausing/starting, recording, answering calls, or the like.

Specifically, the button modules 4*d* may achieve different interaction functions based on the user's operating instruction, for example, clicking the button modules 4*d* once to achieve pausing/starting (such as music, recording, etc.); quickly clicking the button modules 4*d* twice to answer calls; clicking regularly (i.e., clicking once in one second, clicking twice totally) to implement the recording function. In some embodiments, the user's operating instructions may be clicking, sliding, scrolling, or the like, or any combined operations thereof. For example, sliding up and down the surface of the button modules 4*d* to achieve the function of switching songs.

In an application scenario, there are at least two button modules 4*d*, which may correspond to the two ear hooks on the left and right side, respectively. A user may use his/her left and right hands to operate the button modules 4*d*, respectively, to improves the user experience.

In some embodiments, in order to further improve the user's human-machine interaction experience, the function of the human-computer interaction may be assigned to the button modules 4*d* on the left and right side, and the user may operate the corresponding button modules 4*d* according to different functions. For example, for the button modules 4*d* corresponding to the left side: clicking once to turn on the recording function, and clicking once again to turn off the recording function; quickly clicking twice to implement pausing/playing back. As another example, quickly clicking twice on the button modules 4*d* on the right side to answer calls (if the music is played and no phone accesses at this time, the function of switching the next/the previous songs may be implemented).

In some embodiments, the function corresponding to the button modules 4*d* on the left and right side may be user-defined. For example, the user may assign the pausing/playing function executed by the button modules 4*d* on the left side to the button modules 4*d* on the right side by application software settings. As another example, the function of answering calls executed by the button modules 4*d* on the right side may be assigned to the button modules 4*d* on the left side. Further, operating instructions that implement the corresponding function (i.e., the number of clicks, the sliding gestures), may also be set by the user through application software settings. For example, the corresponding operating instruction of answering calls may be set to clicks twice, and the corresponding operating instruction of switching next/last songs may be set from two clicks to three clicks. User-defined settings may conform to user operating habits to a certain extent to avoid operational mistakes and enhance user experiences.

In some embodiments, the human-machine interaction may not be unique, and may be set according to functions frequently used by the user. For example, the button modules 4*d* may also realize the functions such as rejecting calls, reading SMS by voice, or the like, and users may customize settings for functions and operating instructions corresponding to the functions to meet different needs.

In some embodiments, the distance between the center of the button modules 4*d* and the vibration fulcrum may not be greater than the distance between the center of the loudspeaker modules and the vibration fulcrum. Therefore, the vibration acceleration of the loudspeaker assembly 40 may be enhanced to increase the volume produced by the vibration of the loudspeaker assembly 40.

In some embodiments, the center of the button modules 4*d* may be a barycenter m1 or a centroid g1. The distance between the center of the button module 4*d* and the at least one contact point of the loudspeaker assembly may be a first distance. The distance between the center of the core housing and the at least one contact point of the loudspeaker assembly may be a second distance. In some embodiments, a first distance l1 may be set between the barycenter m1 or the centroid g1 of the button modules 4*d* and the ear hook top 25 (i.e., the vibration fulcrum), and a second distance l2 may be arranged between a barycenter m2 or a centroid g2 of the loudspeaker modules (the rest part of the loudspeaker modules 4*d* except for the button modules 4*d*) and the ear hook top 25. It should be noted that the barycenter or the centroid of the loudspeaker modules mentioned above may also be replaced with the barycenter or the centroid of the core housing.

In some embodiments, the mass distribution of the button modules 4*d* and the loudspeaker modules may be relatively uniform, therefore, it may be considered that the barycenter m1 of the button modules 4*d* may coincide with the centroid, and the barycenter m2 of the loudspeaker modules may also coincide with the centroid g2.

In some embodiments, the mass distribution of the button modules 4*d* in the loudspeaker modules 40 may be embodied as a ratio of the first distance l1 to the second distance l2 and a ratio k of the mass of the button modules 4*d* to the mass of the loudspeaker modules.

Specifically, according to the dynamic principle, it may be concluded that when the button modules 4*d* is arranged at a far end 4*h* from the ear hook top 25, the vibration acceleration of the loudspeaker assembly 40 may be smaller than the vibration acceleration when the button modules 4*d* is arranged at a near end 4*g* away from the ear hook top 25, which may result in a decrease in volume. In the case that the mass of the button modules 4*d* is constant, as the ratio of the first distance l1 to the second distance l2 increases, the vibration acceleration of the loudspeaker assembly 40 may be reduced, which in turn causes the volume to decrease. However, in the case that the ratio of the first distance l1 to the second distance l2 is constant, as the mass of the button modules 4*d* increases, the vibration acceleration of the loudspeaker assembly 40 may be reduced, which in turn causes the volume to decrease. Therefore, by adjusting the ratio of the first distance l1 to the second distance l2 and the ratio k of the mass of the button modules 4*d* to the mass of the loudspeaker modules, the setting of the button modules 4*d* resulting in the volume reduction of the loudspeaker assembly 40 may be controlled within the range that the human ear may hear.

In some embodiments, the ratio of the first distance l1 to the second distance 12 may not be more than 1.

Specifically, when the ratio of the first distance l1 to the second distance l2 is equal to 1, the barycenter m2 or the centroid g1 of the button modules 4*d* may coincide with the barycenter m2 or the centroid g2 of the loudspeaker modules. Thus, the button modules 4*d* may be arranged in the center relative to the loudspeaker assembly 40. When the ratio of the first distance l1 to the second distance l2 is less than 1, the barycenter m1 or the centroid g1 of the button modules 4*d* may be closer to the position of the ear hooks top 25 than the barycenter m2 or the centroid g2 of the loudspeaker modules. Thus, the loudspeaker assembly 40 may be arranged closing to the near end of the ear hook top 25. Moreover, the smaller the ratio of the first distance l1 to the second distance l2, the barycenter m1 or the centroid g1 of the button modules 4*d* may be closer to the ear hook top 25 than the barycenter m2 or the centroid g2 of the loudspeaker modules.

In some embodiments, the ratio of the first distance l1 to the second distance 12 may be no more than 0.95, thus the button modules 4*d* may be closer to the ear hook top 25. The ratio of the first distance l1 to the second distance l2 may also be 0.9, 0.8, 0.7, 0.6, 0.5, or the like, specifically, it may be set according to actual requirements, which is not limited herein.

Further, in the case that the ratio of the first distance l1 to the second distance l2 satisfies the range mentioned above, the ratio of the mass of the button modules 4*d* to the mass of the loudspeaker modules may not be more than 0.3.

Specifically, it may not be more than 0.29, 0.23, 0.17, 0.1, 0.06, 0.04, or the like, which is not limited herein.

Additionally, it should be noted that the barycenter m1 of the button module 4*d* may coincide with the centroid g1 (not shown in the figure), that is, at the same point, in one or more embodiments described above. The barycenter m2 of the loudspeaker modules may coincide with the centroid g2 (not shown in the figure). The prerequisite for being the same point is that the mass distribution of the button modules 4*d* and the loudspeaker modules may be relatively uniform.

In some embodiments, the barycenter m1 of the button modules 4*d* may not coincide with the centroid g1. Specifically, since the structure of the button modules 4*d* is relatively simple and regular, the centroid g1 may be easier to calculate. Thus, the centroid g1 may be selected as a reference point. The barycenter m2 of the loudspeaker modules may not coincide with the centroid g2, but since the different materials used in the loudspeaker modules (such as the microphones 432, the flexible circuit board 44, the welding pad, etc., are all mode of different materials), the mass distribution may be uneven, and each part may be irregular (such as the microphones 432, the flexible circuit board 44, the welding pad, etc.). Therefore, the barycenter m2 of the loudspeaker modules may be configured as a reference point.

In an application scenario, corresponding to the embodiments mentioned above, the first distance l1 may be arranged between the centroid g1 of the button modules 4*d* and the ear hook top 25, and the second distance l2 may be arranged between the barycenter m2 of the loudspeaker modules and the ear hook top 25. The mass distribution of the button modules 4*d* in the loudspeaker assembly 40 may be embodied as the ratio of the first distance l1 to the second distance l2, and the ratio k of the mass of the button modules 4*d* to the mass of the loudspeaker modules. Specifically, in the case that the mass of the button modules 4*d* is constant, as the ratio of the first distance l1 to the second distance l2 increases, the vibration acceleration of the loudspeaker assembly 40 may be reduced, which in turn causes the volume to decrease. In the case that the ratio of the first distance l1 to the second distance l2 is constant, as the mass of the button modules 4*d* increases, the vibration acceleration of the loudspeaker apparatus 30 may be reduced, which in turn causes the volume to decrease. Therefore, by adjusting the ratio of the first distance l1 to the second distance l2 and the ratio k of the mass of the button modules 4*d* to the mass of the loudspeaker modules, the setting of the button modules 4*d* resulting in the decrease of the volume may be controlled within the range that the human ear may recognize.

In an application scenario, the ratio of the first distance l1 to the second distance l2 may not be more than 1.

Specifically, when the ratio of the first distance l1 to the second distance l2 is equal to 1, the centroid g1 of the button modules 4*d* may coincide with the barycenter m2 of the loudspeaker modules. Thus, the button modules 4*d* may be arranged in the center relative to the loudspeaker assembly 40. When the ratio of the first distance l1 to the second distance l2 is less than 1, the centroid g1 of the button modules 4*d* may be closer to the position of the ear hooks top 25 than the barycenter m2 of the loudspeaker modules, thereby the button modules 4*d* may be arranged at the near end 4*g* of the loudspeaker assembly 30 closing to the ear hooks top 25. Moreover, the smaller the ratio of the first distance l1 to the second distance l2 is, the centroid g1 of the button modules 4*d* may be closer to the ear hook top 25 than the barycenter m2 of the loudspeaker assembly 30.

Further, the ratio of the first distance l1 to the second distance l2 may not be more than 0.95. Thus, the button modules 4*d* may be closer to the ear hook top 25. The ratio of the first distance l1 to the second distance l2 may also be 0.9, 0.8, 0.7, 0.6, 0.5, or the like, which may specifically be set according to the requirements, and is not limited herein.

Further, in the case that the ratio of the first distance l1 to the second distance l2 satisfies the range mentioned above, the ratio of the mass of the button modules 4*d* to the mass of the loudspeaker modules may not be more than 0.3, specifically, it may not be more than 0.29, 0.23, 0.17. 0.1, 0.06, 0.04, or the like, which is not limited herein.

It should be noted that in another embodiment, the centroid g2 of the loudspeaker modules may still be used as the reference point, and the descriptions herein are similar to the embodiment mentioned above, which is not repeated herein.

Figure 23:
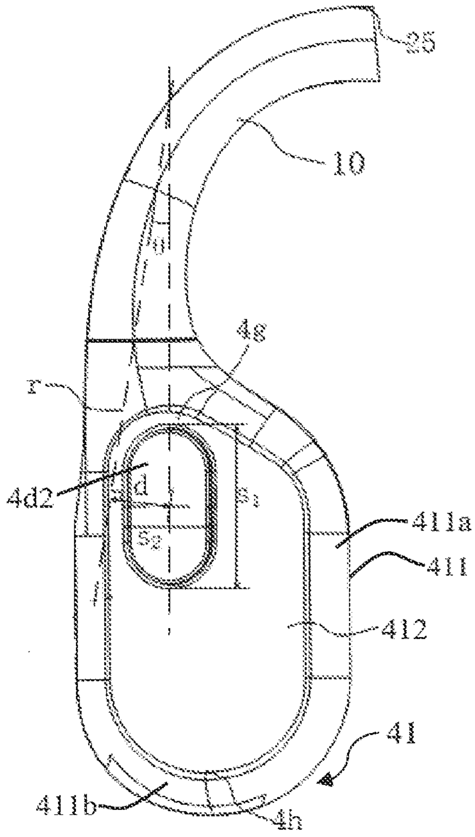
FIG. 23 is a structural diagram of a loudspeaker assembly from another perspective according to some embodiments of the present disclosure.

FIG. 23 is a structural diagram of a loudspeaker assembly of a loudspeaker apparatus from another perspective view according to some embodiments of the present disclosure. In some embodiments, the loudspeaker modules may include the earphone cores 42 configured to generate sound and the core housings 41 configured to accommodate the earphone core 42. In some embodiments, the core housings 41 may be configured with a cavity configured to accommodate the earphone cores 42.

In some embodiments, the peripheric sidewalls 411 may include one or more first peripheric sidewalls 411*a* arranged along a length direction of the outer sidewall 412 and one or more second peripheric sidewalls 411*b* arranged along a width direction of the outer sidewall 412. The outer sidewall 412 and the peripheric sidewalls 411 may be connected together to form the cavity with an opening at one end for accommodating the earphone cores 42.

In some embodiments, both a count of the first peripheric sidewalls 411*a* and a count of the second peripheric sidewalls 411*b* may be two, and the first peripheric sidewalls 411*a* and the second peripheric sidewalls 411*b* may be enclosed in sequence. When the user wears a loudspeaker apparatus, the two first peripheric sidewalls 411*a* may face the front side and rear side of the user's head, respectively, the two second peripheric sidewalls 411*a* may face the upper side and the lower side of the user's head.

In some embodiments, the core housings 41 may further include an outer sidewall 412 corresponding to the bottom wall 416. The outer sidewall 412 may be configured to cover one end of the first peripheric sidewalls 411*a* and the second peripheric sidewalls 411*b* after being enclosed to form the core housings 41 having the cavity with an opening end and a closed end. The earphone cores 42 may be accommodated in the cavity of the core housings 41.

In some embodiments, the shape enclosed by the first peripheric sidewalls 411*a* and the second peripheric sidewalls 411*b* may not be limited herein. The first peripheric sidewalls 411*a* and the second peripheric sidewalls 411*b* may be enclosed into any shape, for example, rectangular, square, circular, elliptical, or the like, suitable for worn on the user's head.

In some embodiments, the shape enclosed by the first peripheric sidewalls 411*a* and the second peripheric sidewalls 411*b* may satisfy principles of ergonomics to improve the user's wearing experience. In some embodiments, the heights of the first peripheric sidewalls 411*a* and the second peripheric sidewalls 411*b* may be the same or different. When the heights of the two peripheric sidewalls 411 connected sequentially is not the same, it should be ensured that a protruding part of the peripheric sidewall 411 does not affect the wearing and operation of the user.

Figure 24:
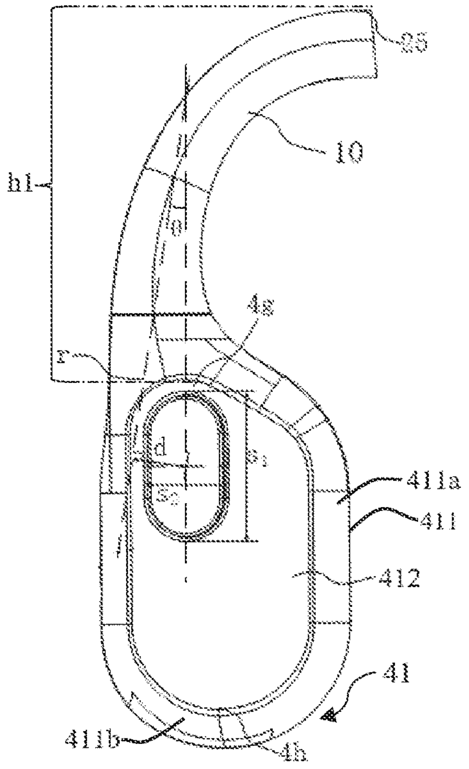
FIG. 24 is a diagram illustrating a distance h1 of a loudspeaker apparatus according to some embodiments of the present disclosure.
Figure 25:
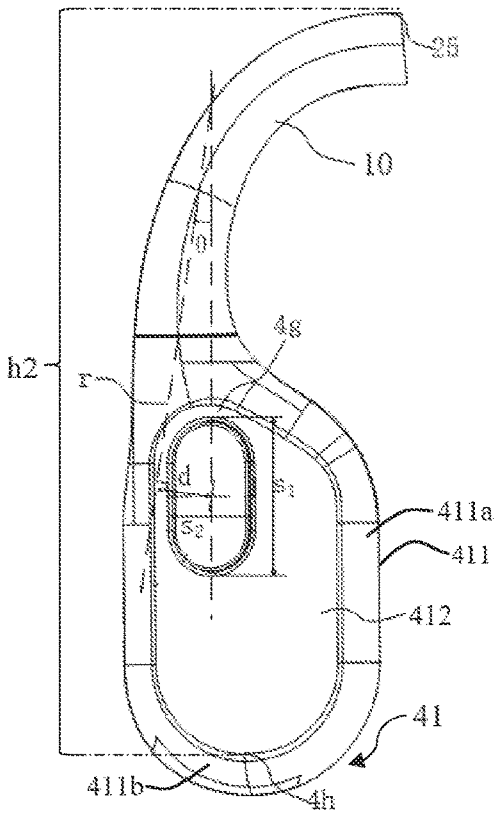
FIG. 25 is a diagram illustrating a distance h2 of a loudspeaker apparatus according to some embodiments of the present disclosure.
Figure 26:
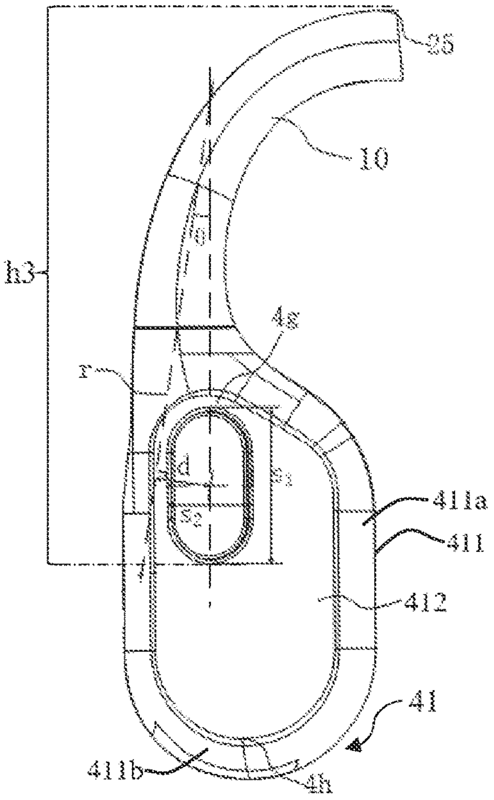
FIG. 26 is a diagram illustrating a distance h3 of a loudspeaker apparatus according to some embodiments of the present disclosure.

FIG. 24 is a diagram illustrating a distance h1 of a loudspeaker apparatus according to some embodiments of the present disclosure. FIG. 25 is a diagram illustrating a distance h2 of a loudspeaker apparatus according to some embodiments of the present disclosure. FIG. 26 is a diagram illustrating a distance h3 of a loudspeaker apparatus according to some embodiments of the present disclosure. In some embodiments, the outer sidewall 412 may be arranged to cover one end enclosed by the first peripheric sidewalls 411*a* and the second peripheric sidewalls 411*b*. When a user wears a loudspeaker apparatus, the outer sidewall 412 may be arranged at one end of the first peripheric sidewalls 411*a* and the second peripheric sidewalls 411*b* away from the user's head. In some embodiments, the outer sidewall 412 may include a near endpoint and a far endpoint, the near endpoint and the far endpoint may be arranged on the contour connecting the outer sidewall 412 with the first peripheric sidewalls 411*a* and the second peripheric sidewalls 411*b*, respectively. The near endpoint and the far endpoint may be arranged at opposite positions of the contour, respectively. In some embodiments, the distance h1 between the near endpoint and the vibration fulcrum may be the shortest, which is called the top position. The distance h2 between the far endpoint and the vibration fulcrum may be the longest, which is called the bottom position. In addition, the distance h3 between a midpoint of a line connecting the near endpoint and the far endpoint and the vibration fulcrum may be between h1 and h2, which is called the middle position.

In an embodiment, the button modules 4*d* may be arranged at the central position of the outer sidewall 412. Alternatively, the button modules 4*d* may be arranged between the central position of the outer sidewall 412 and the top position of the outer sidewall 412.

In one embodiment, the shape of the button 4*d*2 may be a rounded rectangle, and the button 4*d*2 of the rounded rectangular may extend along the length direction of the outer sidewall 412. The button 4*d*2 may include two symmetry axes (a major-axis and a minor-axis), which may be arranged axisymmetrically in two symmetry directions perpendicular to each other.

Figure 27:
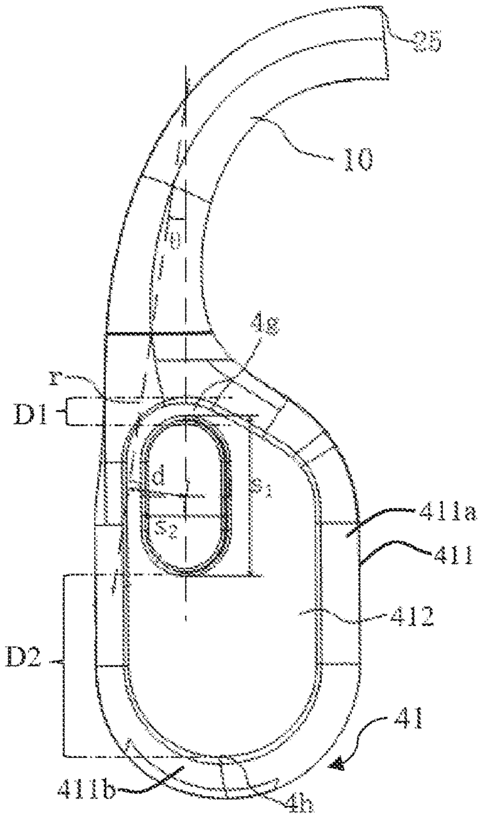
FIG. 27 is a diagram illustrating spacings D1 and D2 of a loudspeaker apparatus according to some embodiments of the present disclosure.

FIG. 27 is a diagram illustrating spacings D1 and D2 of a loudspeaker apparatus according to some embodiments of the present disclosure. As shown in FIG. 27, the spacing between the top of the button 4*d*2 and the top position of the outer sidewall 412 may be a first spacing D1. The spacing between the bottom of the button 4*d*2 and the bottom position of the outer sidewall 412 may be the second spacing D2. The ratio of the first spacing D1 to the second pitch D2 may not be more than 1.

Specifically, when the ratio of the first spacing D1 to the second pitch D2 is equal to 1, the button 4*d*2 may be arranged at the middle position of the outer sidewall 412. When the ratio of the first spacing D1 to the second spacing D2 is less than 1, the button 4*d*2 may be arranged between the middle position of the outer sidewall 412 and the top position.

Further, the ratio of the first spacing D1 to the second spacing D2 may not be more than 0.95. Thus, the button 4*d*2 may be closer to the top position of the outer sidewall 412, i.e., the button 4*d*2 may be closer to the vibration fulcrum, to further improve the volume of the loudspeaker assembly 40. The ratio of the first spacing D1 to the second spacing D2 may also be 0.9, 0.8, 0.7, 0.6, 0.5, or the like. Specifically, it may be set according to the requirements, which is not limited herein.

In some embodiments, a connection part between the ear hooks 10 and the loudspeaker modules may have a central axis. An outer side surface may be included. In some embodiments, the outer side surface of the button 4*d*2 may be a side surface away from the user's head when the user wears the loudspeaker apparatus. In some embodiments, the extension line r of the central axis may have a projection on the plane of the outer sidewall of the button. The angle θ between the projection and the major-axis direction of the button 4*d*2 may be less than 10°. Specifically, it may be 9°, 7°, 5°, 3°, 1°, or the like, which is not specifically limited herein.

When the angle θ between the projection of the extension line r on the plane that the outer side surface of the button 4*d*2 is arranged and the major-axis direction is less than 10°, the major-axis direction of the button 4*d*2 may not deviate too much from the extension line r. Thus, the major-axis direction of the button 4*d*2 may be consistent or nearly consistent with the direction of the extension line r of the central axis.

In some embodiments, the extension line r of the central axis may have the projection on the plane where the outer side surface of the button 4*d*2 is arranged. The major-axis direction and the minor-axis direction of the outer sidewall of the button 4*d*2 may have an intersection point, and the projection and the intersection point may have the shortest distance d. The shortest distance d may be smaller than the size S2 of the outer sidewall of the button 4*d*2 in the minor-axis direction. Thus, the button 4*d*2 may close to the extension line r of the central axis of the ear hooks. In some embodiments, the projection of the extension line r of the central axis of the ear hooks 10 on the plane where the outer side surface of the button 4*d*2 is arranged may coincide with the plane of the major-axis direction to further improve the sound quality of the loudspeaker assembly 40.

In some embodiments, the major-axis of the button 4*d*2 may be in the direction from the top of the button 4*d*2 to the bottom of the button 4*d*2, or the direction that the ear hooks 10 is connected to the core housings 41. The minor-axis of the button 4*d*2 may be along a direction of a straight line perpendicular to the major-axis of the button 4*d*2 and passing through the midpoint of the connection line between the top and the bottom. The button 4*d*2 may have a size of s1 in the major-axis direction, and a size of s2 in the peripheric direction.

In some embodiments, the first peripheric sidewalls 411*a* may have the bottom position, the middle position, and the top position along a direction closing to the vibration fulcrum.

The bottom position may be a connection point of the first peripheric sidewalls 411*a* and the second peripheric sidewalls 411*b* away from the ear hooks 10. The top position may be a connection point of the first peripheric sidewalls 411*a* and the second peripheric sidewalls 411*b* closing to the ear hooks 10. The middle position may be a midpoint of the bottom position of the first peripheric sidewalls 411*a* and the top position.

In some embodiments, the button modules 4*d* may be arranged in the middle position of the first peripheric sidewalls 411*a* (not shown in the figure), or the button modules 4*d* may be arranged between the middle position of the first peripheric sidewalls 411*a* and the top position (not shown in the figure). The button modules may be centrally arranged on the first peripheric sidewalls 411*a* along the width direction of the first peripheric sidewalls 411*a* of 4*d*.

Figure 28:
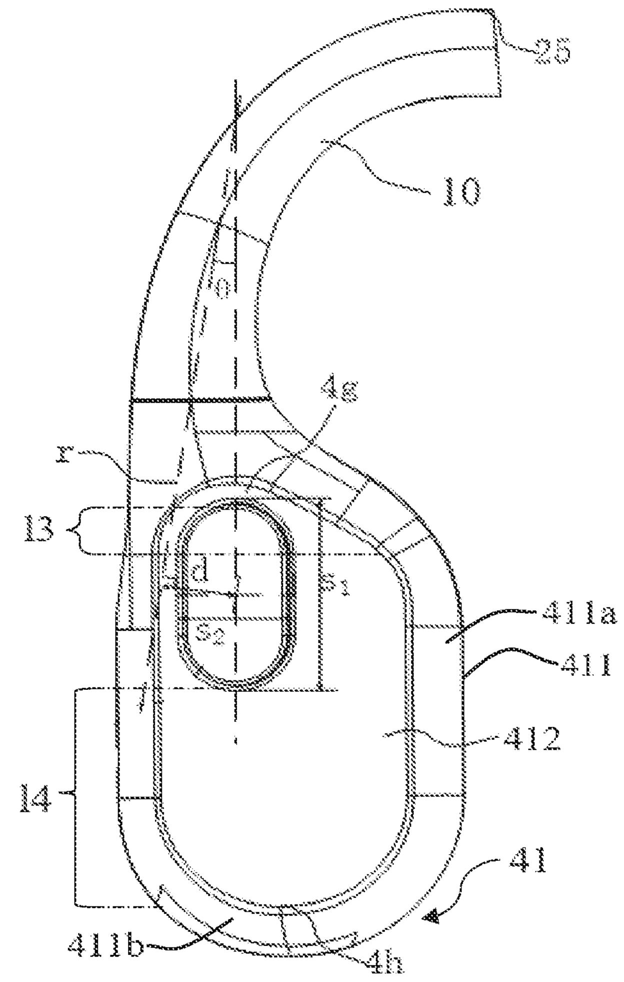
FIG. 28 is a diagram illustrating distances l3 and l4 of a loudspeaker apparatus according to some embodiments of the present disclosure.

FIG. 28 is a diagram illustrating distances l3 and l4 of a loudspeaker apparatus according to some embodiments of the present disclosure. In some embodiments, the spacing between the top of the button modules **4*d* and the top position of the first peripheric sidewalls 411*a* may have a third distance l3. The spacing between the bottom of the button modules 4*d* and the bottom position of the first peripheric sidewall 411 may have a fourth distance l4. The ratio of the third distance l3 to the fourth distance l4** may be no more than 1.

Further, the ratio of the third distance l3 to the fourth distance l4 may not be more than 0.95. Thus, the button modules **4*d* may be closer to the top position of the first peripheric sidewalls 411*a*, that is, the button modules 4*d* may be closer to the vibration fulcrum, to further improve the volume of the loudspeaker assembly 40. The ratio of the third distance l3 to the fourth distance l4** may also be 0.9, 0.8, 0.7, 0.6, 0.5, or the like, which may be set according to the requirements, which is not limited herein.

As set forth above, a third spacing D3 may exist between the top of the button **4*d*2 and the top position of the first peripheric sidewalls 411*a*, and a fourth spacing D4 may exist between the bottom of the button 4*d*2 and the bottom position of the first peripheric sidewalls 411*a*. The ratio of the third spacing D3 to the fourth spacing D4** may not be more than 1.

Further, the ratio of the third spacing D3 to the fourth spacing D4 may not be more than 0.95. Thus, the button **4*d*2 may be closer to the top position of the first peripheric sidewalls 411*a*, that is, the button 4*d*2 may be closer to the vibration fulcrum to further improve the volume of the loudspeaker assembly 40. The ratio of the third spacing D3 to the fourth spacing D4** may also be 0.9, 0.8, 0.7, 0.6, 0.5, or the like. It may specifically be set according to the requirements, which is not limited herein.

It should be noted that the descriptions of the loudspeaker apparatus are merely an example, and should not be considered as the only feasible implementation option. Obviously, for those skilled in the art, after understanding the basic principles of the loudspeaker apparatus, various modifications and changes in forms and details may be made to the specific methods and steps of implementing the loudspeaker apparatus without departing from the principle, but these modifications and changes are still within the scope described above. For example, the button modules **4*d* may be arranged in one of the loudspeaker assemblies 40 arranged on the left side and right side, or two of the loudspeaker assemblies 40 may be equipped with the button modules 4*d***. Such deformations are within the scope of the present disclosure.

Figure 29:
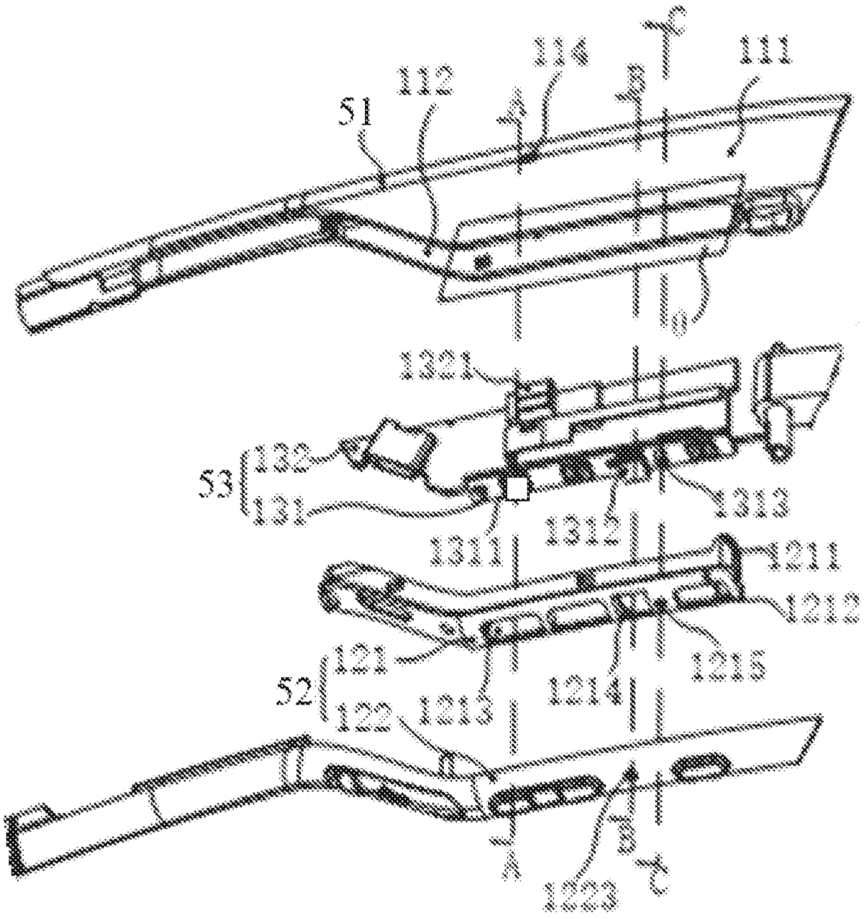
FIG. 29 is an exploded structural diagram of a loudspeaker apparatus according to some embodiments of the present disclosure.
Figure 30:
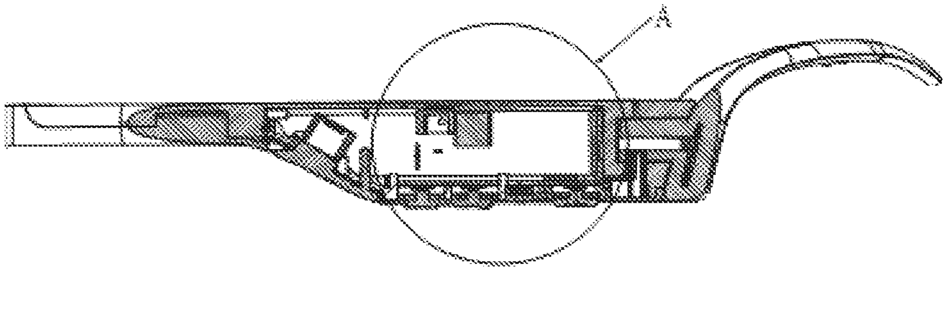
FIG. 30 is a partial sectional view of a loudspeaker apparatus according to some embodiments of the present disclosure.
Figure 31:
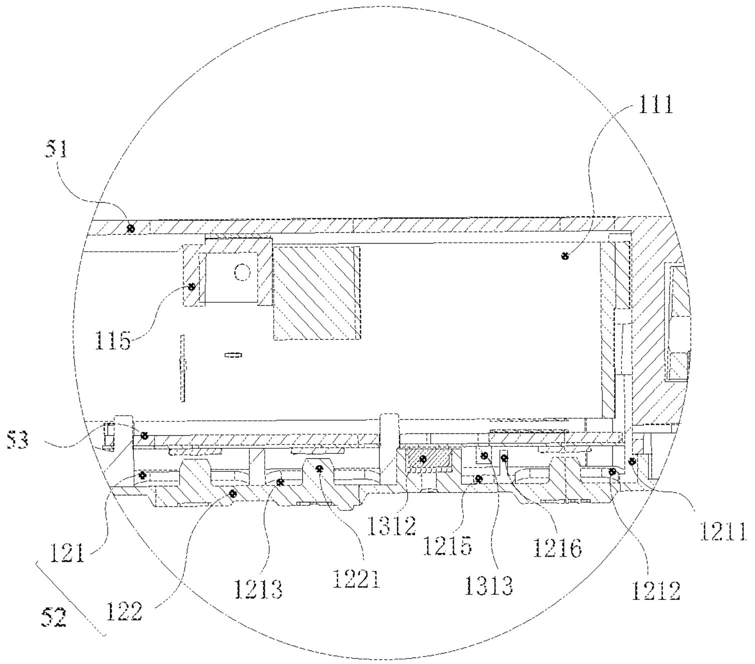
FIG. 31 is an enlarged structural diagram of part A in FIG. 30.

FIG. 29 is an exploded structural diagram of a loudspeaker apparatus according to some embodiments of the present disclosure. FIG. 30 is a partial sectional view of a loudspeaker apparatus according to some embodiments of the present disclosure. FIG. 31 is an enlarged structural diagram of part A in FIG. 30. As shown in FIGS. 29-31, the loudspeaker apparatus may include an assembly body, and a cavity 111 may be formed inside the assembly body. It should be noted that the assembly body may correspond to the core housings 41 in the present embodiments mentioned above.

The assembly body may be a structure composed of at least two components. It may also be a structure formed by integral molding techniques, such as a structure integrally formed by an integral injection process. The spatial shape of the assembly body may include, but is not limited to, a rectangle, a square, an ellipsoid, a sphere, a cone, or other irregular space shapes. Materials of the assembly body may include but are not limited to, one or more combinations of plastics, silica gel, rubber, plastic, glass, ceramics, alloy, stainless steel, or the like.

In some embodiments, the assembly body may include an accommodating body 51 and a cover 52. The accommodating body 51 may be hollow inside to form the cavity 111, the accommodating body 51 may be arranged with an opening 112 communicating with the cavity 111, and the cover 52 may be arranged on the opening 112 to make the cavity 111 be closed. The cavity 111 may be an internal cavity formed by two or more components when assembled. It may also be an internal cavity formed according to the shape of a mold during the integral molding process of the components. The cavity 111 may be configured to accommodate a plurality of electronic elements and circuit structures of the loudspeaker apparatus. The assembly body 50 may be used to seal the cavity 111, the cavity may be completely sealed by the assembly body 50, or may be co-sealed by other parts of the assembly body 50 and the assembly body 50.

It should be noted that the accommodating body may correspond to the peripheric sidewalls in the present embodiments mentioned above, and the cover may correspond to the bottom wall in the present embodiments mentioned above.

The accommodating body 51 may be at least a part of the loudspeaker apparatus. Specifically, the accommodating body 51 in the present embodiment may be a structure to accommodate, for example, a circuit board, a battery, an electronic element, or the like. For example, it may be an overall or part of the outer housing of the loudspeaker apparatus.

Further, the accommodating body 51 may be used to accommodate the circuit board, the battery, and/or the electronic elements via the cavity 111 having the opening 112. The opening 112 may communicate with the cavity and may be used as a loading and unloading channel for the circuit board, the battery, and/or the electronic elements, or the like. Specifically, the count of the opening 112 may be one or more, which is not limited herein.

Further, the shape of the cover 52 may at least partially match the opening 112. Thus, the cover 52 may be arranged on the opening 112 to seal the cavity 111. The material of the cover 52 may be different from the accommodating body 11, or at least partially the same.

In the present embodiment, the cover 52 may include a hard bracket 121 and a soft cover layer 122. The hard bracket 121 may be used to mechanically connect with the accommodating body 51. The soft cover layer 122 may be integrally injected on the surface of the hard bracket 121, and may be used to connect the hard bracket 121 and the accommodating body 51 to provide a seal for the cavity 111.

Specifically, the material of the hard bracket 121 may be a hard plastic, and the material of the soft cover layer 122 may be a soft silica gel, rubber, or the like. The shape of the hard bracket 121 facing one side of the accommodating body 51 may match the opening 112 and fixed to the opening 112 of the cavity 111 by inserting, buckling, or the like, to be mechanically connected to the accommodating body 51. However, a gap may be easily formed at the connection between the hard bracket 121 and the accommodating body 51 to reduce the sealing performance of the cavity 111. Further, the soft cover layer 122 may be integrally injection molded on the outer surface of the hard bracket 121 away from the outer surface of the accommodating body 51, and may further cover the connection between the hard bracket 121 and the accommodating body 51 to realize the sealing of the cavity 111.

In the present embodiment mentioned above, the cover 52 may include the hard bracket 121 and the soft cover layer 122 integrally injection molded on the surface of the hard bracket 121. The hard bracket 121 may be mechanically connected to the accommodating body 51. The soft cover layer 122 may further provide a seal for the cavity 111 after the hard bracket 121 is connected with the accommodating body 51, and the soft cover layer 122 may be more conductive to fit the gap between the hard bracket 121 and the accommodating body 51 to further improve the sealing performance of the loudspeaker apparatus, thereby improving the waterproof effect of the loudspeaker apparatus. At the same time, the hard bracket 121 and the soft cover layer 122 may be integrally formed by injection molding to simplify the assembly step of the loudspeaker apparatus.

In one embodiment, the hard bracket 121 may include an insert part 1211 and a cover part 1212. The cover part 1212 may be arranged on the opening 112, and the insert part 1211 may be arranged on one side of the cover part 1212 and extend along the inner wall of the cavity 111 to the inside of the cavity 111 to fix the cover part 1212 on the opening 112.

In an application scenario, the insert part 1211 may not be inserted via the inner wall of the cavity 111. For example, the inside of the cavity 111 may also be arranged with a plug part that matches the shape of the insert part 1211 of the hard bracket 121. Thus, the insert part 1211 may be plugged with the plug part to fix the plug part inside the cavity 111. For example, when the shape of the insert part 1211 is a cylinder, the plug part may be a ring capable of surrounding the cylindrical plug part, wherein the inner diameter of the plug part of the ring may be appropriately smaller than the outer diameter of the cylindrical plug part. Therefore, when the insert part 1211 is inserted into the plug part, an interference fit with the plug part may enable the hard bracket 121 to be connected to the cavity 111 stably. Certainly, other plug ways may also be employed as long as the insert part 1211 may be inserted into the cavity 111 and fixed to the cavity 111.

Specifically, the cover part 1212 may be arranged on one side of the insert part 1211 away from the cavity 111 and cover the opening 112 after the insert part 1211 is inserted into the cavity 111. The cover part 1212 may be a complete structure, or may further be arranged with some holes as needed, thereby implementing a certain function.

Figure 32:
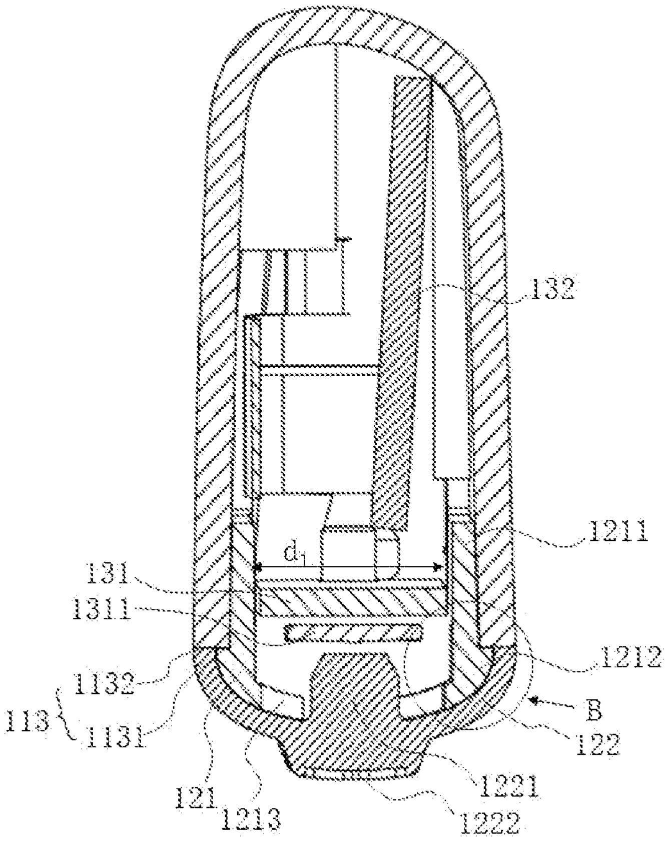
FIG. 32 is a sectional view of a loudspeaker apparatus in a combined state along A-A axis in FIG. 29 of the present disclosure.

Referring to FIG. 32, FIG. 32 is a sectional view of a loudspeaker apparatus in a combined state along A-A axis in FIG. 29 according to some embodiments of the present disclosure. In one embodiment, the accommodating body 51 may include an opening edge 113 configured to define the opening 112. The cover part 1212 may be pressed against an inner side area 1131 of the opening edge 113 closing to the opening 112. The soft cover layer 122 may cover the outer surface of the cover part 1212 away from the accommodating body 51, and press against an outer side area 1132 of the periphery of the inner side area 1131 of the opening edge 113, thereby realizing the sealing with the opening edge 113.

The inner side area 1131 and the outer side area 1132 of the opening edge 113 may both belong to the opening edge 113, rather than another area other than the opening edge 113. The inner side area 1131 of the opening edge 113 may be an area closing to the opening 113, and the outer side area 1132 of the opening edge 113 may be an area that the opening edge 113 is away from the opening 112.

In the present embodiment, the cover part 1212 of the hard bracket 121 may be pressed against the inner side area 1131 of the opening edge 113 closing to the opening 112, which enables the cover part 1212 to seal the opening edge 113 firstly. However, since the accommodating body 51 and the hard bracket 121 may be made of hard materials, the connection between the two and the further coverage of the cover part 1212 may not achieve a better sealing effect. A gap may be easily formed between the end that the cover part 1212 is pressed against the opening edge 113 away from the opening 112 and the opening edge 113, and further penetrate the cavity 111 via the gap to reduce the sealing performance. Therefore, in the present embodiment, the soft cover layer 122 may cover the outer surface of the cover part 1212 away from the accommodating body 51 and further be pressed against on the outer side area 1132 of the periphery of the inner side area 1131 of the opening edge 113. Thus, the gap formed between the cover part 1212 of the hard bracket 121 and the opening edge 113 may be further covered, and since the soft cover layer 122 is a soft material, it may further improve the sealing effect of the loudspeaker apparatus, which makes the waterproof performance of the loudspeaker apparatus to be better.

Figure 33:
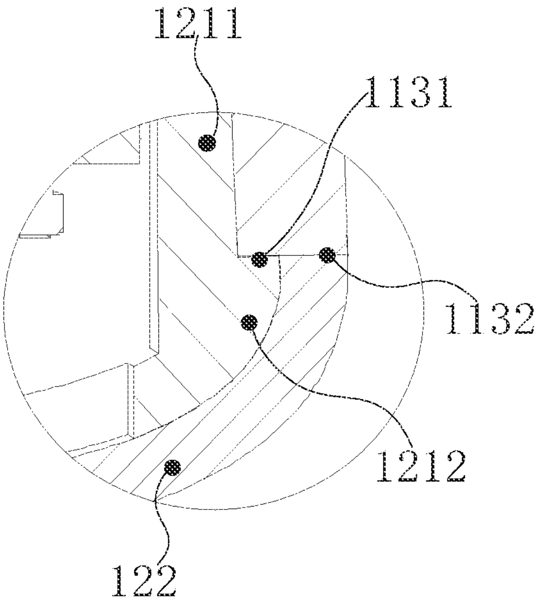
FIG. 33 is an enlarged structural diagram of part B in FIG. 32.

Referring to FIG. 33, FIG. 33 is an enlarged structural diagram of part B in FIG. 32. In an application scenario, when the cover 52 is in a buckled state, the periphery of the opening edge 1212 may cover the inner side area 1131 of the opening edge 113 and contact with the inner side region 1131 of the opening edge 113. The soft cover layer 122 may be arranged on one side of the cover part 1212 away from the accommodating body 51. Thus, the cover part 1212 arranged on the inner side area 1131 of the opening edge 113 may be sandwiched between the inner side area 1131 of the opening edge 113 and the soft cover layer 122. The soft cover layer 122 may further extend in the direction of the cover part 1212 away from the opening 112 and in the direction facing the opening edge 113 until contacting the outer side area 1132 of the opening edge 113. Thus, the contact end surface between the cover part 1212 and the opening edge 113 and the contact end surface between the soft cover layer 122 and the opening edge 113 may be arranged flush with each other, and a structure of "the opening edge 113-the cover part 1212-the soft cover layer 122" may be formed on the inner side area 1131 of the opening edge 113.

Figure 34:
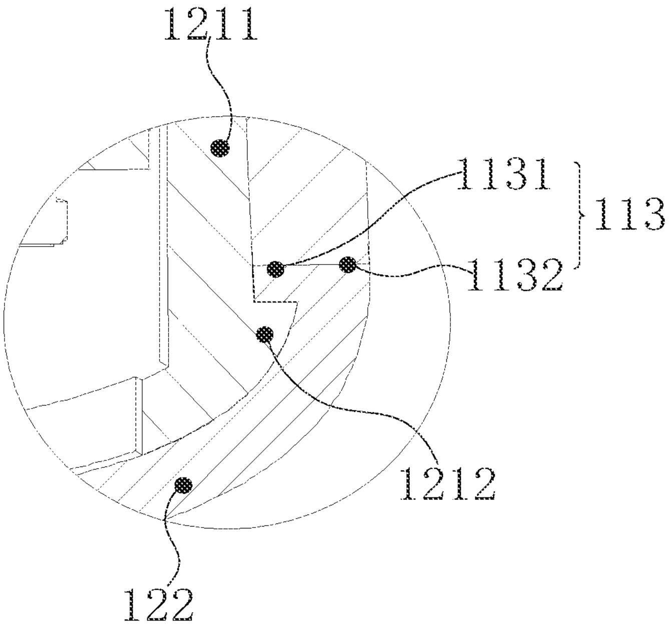
FIG. 34 is a partial sectional view of a loudspeaker apparatus according to some embodiments of the present disclosure.

In another application scenario, referring to FIG. 34, FIG. 34 is a partial sectional view of a loudspeaker apparatus according to some embodiments of the present disclosure. In the application scenario, after the soft cover layer 122 further extends to contact the outer side area 1132 of the opening edge 113, it may further extend to the inner side area 1131 of the opening edge 113 along the area between the cover part 1212 and the opening edge 113. Further, it may be assumed that between the inner side area 1131 of the opening edge 113 and the cover part 1212, the cover part 1212 may be pressed against the inner side area 1131 of the opening edge 113 to form a structure of "the opening edge 113-the soft cover layer 122-the cover part 1212-the soft cover layer 122". In the application scenario, the soft cover layer 122 may further extend between the hard bracket 121 and the opening edge 113 on the basis of the cover part 1212 covering the hard bracket 121, thereby further improving the sealing between the cavity 111 and the cover 52 and the waterproof effect of the loudspeaker apparatus.

In one embodiment, referring to FIG. 29 to FIG. 34, the loudspeaker apparatus may further include a circuit assembly 53 arranged in the cavity 111 and a switch 1311 arranged on the circuit assembly 53.

Specifically, the circuit assembly 53 may include a first circuit board 131, and the switch 1311 may be arranged on the outer side of the first circuit board 131 facing the opening 112 of the cavity 111. The count of the switch 1311 may be one or more. When the count of the switch 1311 is plural, the switches may be arranged on the first circuit board 131 at intervals.

It should be noted that the first circuit board 131 may correspond to the first branch circuit board in the present embodiments mentioned above.

Accordingly, the hard bracket 121 may be equipped with a switch hole 1213 corresponding to the switch 1311. The soft cover layer 122 may further cover the switch hole 1213. A pressing part 1221 may be arranged at a position corresponding to the switch hole 1213. The pressing part 1221 may extend toward the inside of the cavity 111 via the switch hole 1213. When the corresponding position of the soft cover layer 122 is pressed, the pressing part 1221 may press against the switch 1311 on the circuit assembly 53 to trigger the circuit assembly 53 to perform a preset function.

The pressing part 1221 arranged on the soft cover layer 122 may be formed by the side of the soft cover layer 122 toward the hard bracket 121 protruding toward the direction of the switch hole 1213 and the switch 1311. The shape of the pressing part 1221 may match the switch hole 1213. When the position corresponding to the soft cover layer 122 is pressed, the pressing part 1221 may pass through the switch hole 1213 to the corresponding switch 1311 on the first circuit board 131. At the same time, the length of the pressing part 1221 in the direction toward the direction of the switch 1311 may be set to make the switch 1311 be not pressed against when the position corresponding to the soft cover layer 122 is not pressed, but may be pressed against the corresponding switch 1311 when pressed.

In an application scenario, the position of the soft cover layer 122 corresponding to the pressing part 1221 may further protrude toward the side away from the hard bracket 121 to form a convex pressing part 1222. Thus, the user may determine the position of the switch 1311 and press the corresponding pressing part 1222 to make the circuit assembly 53 perform corresponding functions.

In some embodiments, a first microphone element 1312 and a second microphone element 1321 may be distributed in the core housings 41 in a particular manner. Thus, the main sound source (e.g., a human mouth) may be arranged in a direction that the second microphone element 1321 points to the first microphone element 1312.

It should be noted that the first microphone element 1312 may correspond to the first microphone 432*a* in the present embodiments mentioned above, and the second microphone element 1321 may correspond to the second microphone 432*b* in the present embodiments mentioned above.

When the user wears the loudspeaker apparatus, since the distance of the mouth (main sound source) relative to the first microphone element 1312 and the second microphone element 1321 may be shorter than the distance of other sound sources (e.g., noise sound source) in the environment relative to the first microphone element 1312 and the second microphone element 1321, it may be considered that the mouth is the near-field sound source of the first microphone element 1312 and the second microphone element 1321. For the near-field sound source, the volume received by the two groups of the microphone assemblies may be related to the distance from the sound source. Since the first microphone element 1312 is closer to the main sound source, the first microphone element 1312 may receive a larger audio signal. The second microphone element 1321 is far from the main sound source. Thus, the second microphone element 1321 may receive a smaller audio signal, that is, $V_{j1}>V_{j2}$.

Since the distance of the noise sound source in the environment is relatively far away from the first microphone element 1312 and the second microphone element 1321, it may be considered that the noise sound source in the environment is a far-field sound source of the first microphone element 1312 and the second microphone element 1321. For the far-field sound source, the noise signals received by the two groups of the microphone assemblies may be similar, that is, $V_{Y1}\approx V_{Y2}$.

Therefore, the total signal received by the first microphone element 1312 may be:

$$V_1 = V_{J1} + V_{Y1} \quad (1)$$

The total signal received by the second group of the microphone assemblies may be:

$$V_2 = V_{J2} + V_{Y2} \quad (2)$$

In order to exclude noise in the received sound signal, the total sound signal of the first microphone element 1312 and the second microphone element 1321 may be differentially processed. The form of the differential processing may be in the following form:

$$V = V_1 - V_2 = (V_{J1} - V_{J2}) + (V_{Y1} - V_{Y2}) \approx V_{J1} - V_{J2} \quad (3)$$

Further, according to the differential results of the signal obtained by the equation (3), combined with the distance between the first microphone element 1312 and the second microphone element 1321 relative to the main sound source, it may further obtain an audio signal from the main sound source that is actually obtained by the first microphone element 1312 and the second microphone element 1321.

Therefore, in order to ensure the quality of the final acquired audio signal, the differential result of the signal obtained by the equation (3) should be as large as possible, that is, $V_{j1}>>V_{j2}$. In some embodiments of the present disclosure, the effect may be implemented in the following manner: allowing the installation position of the first microphone element 1312 to be as close as possible to the main sound source (such as a human mouth); allowing the installation position of the second microphone element 1321 to be as far as possible from the main sound source (such as a human mouth); isolating two microphone spaces; setting a sound barrier or the like between the two microphone elements. It should be noted that the ways mentioned above may improve the quality of the audio signal, which may be used singly or in combination.

In some embodiments, in order to make the installation position of the first microphone element 1312 be as close as possible to the main sound source (such as a human mouth), the first circuit board 131 and the first microphone element 1312 installed thereon may be arranged to be inclined. In some embodiments, in order to make the installation position of the second microphone element 1321 be as far as possible from the main sound source (such as a human mouth), the second circuit board 132 and the second microphone element 1321 installed thereon may be arranged to be inclined to flexibly adjust the required installation distance. At the same time, the corresponding sound guide channel and sound barrier may be arranged in the installation area of each microphone assembly. Specific installation methods may further refer to FIGS. 35-37 and related description thereof.

Figure 35:
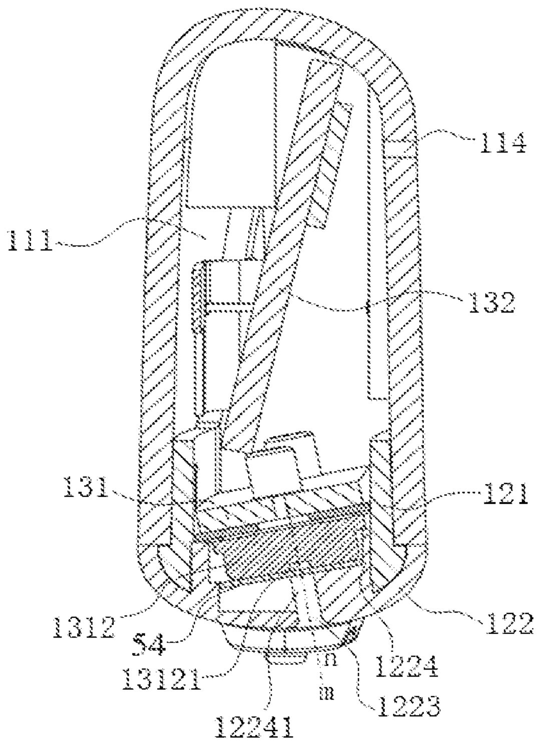
FIG. 35 is a sectional view of a loudspeaker apparatus in a combined state along B-B axis in FIG. 29 of the present disclosure.
Figure 36:
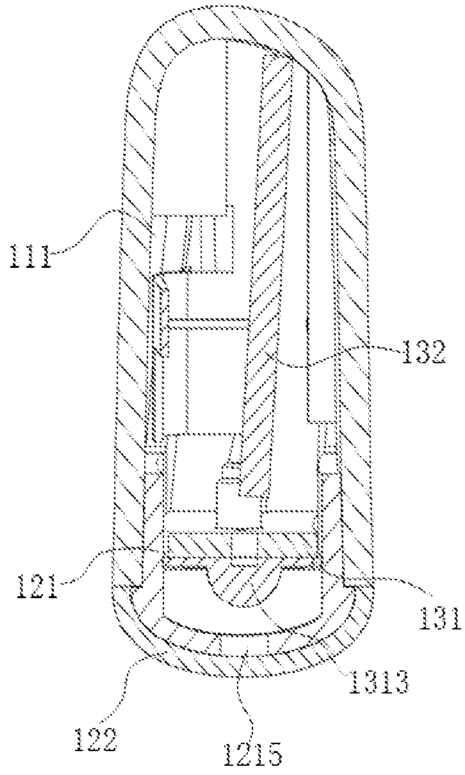
FIG. 36 is a structural diagram of different angles between a first circuit board and a second circuit board and FIG. 35 according to some embodiments of the present disclosure.

In one embodiment, referring to FIGS. 35 and 36, FIG. 35 is a sectional view of a loudspeaker apparatus in a combined state along B-B axis in FIG. 29 according to some embodiments of the present disclosure. FIG. 36 is a structural diagram of different angles between a first circuit board and a second circuit board and FIG. 35 according to some embodiments of the present disclosure. The first circuit board 131 may include the first microphone element 1312. Specifically, the first circuit board 131 may be arranged facing the cover 52. The first microphone element 1312 may be arranged on one side of the first circuit board 131 facing the cover 52. For example, the first microphone element 1312 may be arranged on the first circuit board 131 at intervals from the switch 1311 in the present embodiments mentioned above. Specifically, the first microphone element 1312 may be configured to receive a sound signal from the outside of the core housings 41, and convert the sound signal into an electrical signal for analysis.

Accordingly, the hard bracket 121 may be arranged with a microphone hole 1214 corresponding to the first microphone element 1312, and a first sound guide hole 1223 corresponding to the microphone hole 1214 may be arranged on the soft cover layer 122. The first sound guide hole 1223 may be set corresponding to the first microphone element 1312.

Specifically, the first sound guide hole 1223 may be arranged on the cover 52. One end of the first sound guide hole 1223 may connect the microphone hole 1214 on the cover 52, and the other end of the first sound guide hole 1223 may face the first microphone element 1312, thereby, a sound guide distance may be shortened and the sound guide effect may be improved.

Specifically, the first circuit board 131 may face the cover 52 in a manner that is parallel or inclined to the cover 52, and the first sound guide hole 1223 may be vertically or inclined to the surface of the cover 52.

In some embodiments, the depth direction of the opening 112 may be vertical or inclined relative to the bottom of the accommodating body 51. When the opening 112 is vertically, the cover 52 may be horizontal with respect to the accommodating body 51 after being closed. When the opening 112 is inclined, the cover 52 may be inclined with respect to the accommodating body 51 after being closed. The inclination refers to the inclination facing one side of the mouth of a human body. In this way, the first sound guide hole 1223 may face the mouth or face of a human more directly, and the effect of the microphone assembly on obtaining the sound of the main sound source may be improved.

Further, when the opening 112 is inclined, the angle between the plane that the opening 112 is arranged and the plane that the width direction of the accommodating body is arranged may be in the range of 10° to 30°. Thus, the first sound guide hole 1223 may further face the human mouth area. Specifically, when the opening 112 is inclined, the angle between the plane that the opening 112 is arranged and the plane that the width direction of the accommodating body is arranged may be any angle within the range mentioned above, such as 10°, 15°, 20°, 23°, 27°, 30°, or the like, which is not specifically limited herein.

Specifically, the first sound guide hole 1223 may penetrate through the soft cover layer 122. When the opening 112 is vertical and the first circuit board 131 is parallel to the cover 52, the first sound guide hole 1223 may be arranged perpendicular to the cover 52, that is, the first sound guide hole 1223 may be vertical. When the opening 112 is vertical and the first circuit board 131 is inclined to the cover 52, the first sound guide hole 1223 may be arranged inclined to the cover 52, that is, the first sound guide hole 1223 may be inclined. When the opening 112 is inclined and the first circuit board 131 is arranged parallel to the cover 52, the first sound guide hole 1223 may be arranged perpendicular to the cover 52, that is, the first sound guide hole 1223 may be inclined. When the opening 112 is inclined and the first circuit board 131 is inclined to the cover 52, the first sound guide hole 1223 may be arranged inclined to the cover 52, that is, the first sound guide hole 1223 may be vertical or inclined.

Further, when the first circuit board 131 faces the cover 52 in a manner that is inclined to the cover 52, the angle between the plane that the first circuit board 131 is arranged and the plane that the cover 52 is arranged may be in the range of 5° to 20°. Specifically, when the first circuit board 131 faces the cover 52 in a manner that is inclined to the cover 52, the angle between the plane that the first circuit board 131 is arranged and the plane that the cover 52 is arranged may be any angle in the range such as 5°, 8°, 10°, 15°, and 20°, which is not specifically limited herein.

Specifically, the first sound guide hole 1223 may correspond to the microphone hole 1214 on the hard bracket 121, thereby connecting the first microphone element 1312 to the outside of the core housings 41. Thus, the sound outside the core housings 41 may pass through the first sound guide hole 1223 and the microphone hole 1214 to be received by the first microphone element 1312.

In order to further improve the sound guide effect, the central axis of the first sound guide hole 1223 may coincide with the main axis of the first microphone element 1312. A sound receiving area 13121 of the first microphone element 1312 refers to an area (e.g., a diaphragm) on the first microphone element 1312 that receives sound waves. When the central axis of the first sound guide hole 1223 coincides with the main axis of the sound receiving area 13121 of the first microphone element 1312, the sound of the main sound source collected by the microphone hole 1214 may directly direct to the sound receiving area 13121 of the first microphone element 1312 via the first sound guide hole 1223, thereby further reducing the propagation route of the sound, which may avoid the loss and echo of the main sound source in the cavity and the transmission of the main sound source via the channel in the cavity to the area that the second microphone element 1321 is arranged to realize the function of improving the sound effect.

In one embodiment, the cover 52 may be arranged in a long strip, wherein the main axis of the first sound guide hole 1223 may coincide with the main axis of the sound receiving area 13121 of the first microphone element 1312 in the width direction of the cover body 52. The main axis of the sound receiving area 13121 of the first microphone element 1312 refers to the main axis of the sound receiving area 13121 of the first microphone element 1312 in the width direction of the cover body 52, such as the axis n in FIG. 35, the main axis of the first sound guide hole 1223 may be the axis m in FIG. 35, and the axis n may coincide with the axis m.

Further, the shape of the first sound guide hole 1223 may be any shape, as long as the sound from the outside of the loudspeaker apparatus may be input. In an application scenario, the first sound guide hole 1223 may be a round hole with a relatively small size and arranged in the area of the cover 52 corresponding to the microphone hole 1214. The first sound guide hole 1223 with a small size may reduce the communication between the first microphone element 1312, or the like, in the loudspeaker apparatus and the outside, thereby increasing the closure of the loudspeaker apparatus.

Further, in order to guide the sound signal from the first sound guide hole 1223 to the first microphone element 1312, the sound guide channel 12241 may be set in a curved shape.

Specifically, in an application scenario, the main axis of the first sound guide hole 1223 may be arranged in the middle part of the cover 52 in the width direction of the cover 52.

At the same time, the soft cover layer 122 may also be arranged with a first sound barrier 1224 in a position corresponding to the microphone hole 1214. The first sound barrier 1224 may extend toward the inside of the cavity 111 via the microphone hole 1214 and define a sound guide channel 12241. One end of the sound guide channel 12241 may be connected to the first sound guide hole 1223 on the soft cover layer 122, and the first microphone element 1312 may be inserted into the sound guide channel 12241 from the other end of the sound guide channel 12241.

When the loudspeaker apparatus also includes the switch 1311 in the present embodiments mentioned above, the switch hole 1213 and the microphone hole 1214 may be arranged on the hard bracket 121 at intervals.

Further, the spacing distance of the switch hole 1213 and the microphone hole 1214 may be 10 to 20 mm, specifically, which may also be 10 mm, 15 mm, 20 mm, or the like.

Correspondingly, the first sound barrier 1224 may extend inside the cavity 111 to the periphery of the first microphone element 1312 through the microphone hole 1214 from the soft cover layer 1224 to the periphery of the first sound guide hole 1223. Thus, the sound guide channel 12241 from the first sound guide hole 1223 to the first microphone element 1312 may be formed, thereby, the sound signal of the loudspeaker apparatus entering into the sound guide channel may reach the first microphone element 1312 directly via the sound guide channel 12241.

Specifically, the shape of the sound guide channel 12241 on the section perpendicular to the length direction may be consistent with the shape of the microphone hole 1214 or the first microphone element 1312. Certainly, the shape of the sound guide channel 12241 on the section perpendicular to the length direction may be inconsistent with the shape of the microphone hole 1214 or the first microphone element 1312. In an application scenario, the sectional shapes of the microphone hole 1214 and the first microphone element 1312 in the direction perpendicular to the hard bracket 121 facing the cavity 111 may both be quadrangular, and the size of the microphone hole 1214 may be slightly larger than the peripheric size of the sound guide channel 12241. However, the inner size of the sound guide channel 12241 may not be smaller than the peripheric size of the first microphone element 1312. Thus, the sound guide channel 12241 may pass through the first sound guide hole 1223 to the first microphone element 1312 and wrap around the periphery of the first microphone element 1312.

As set forth above, the soft cover layer 122 of the loudspeaker apparatus may be arranged with the first sound guide hole 1223 and the sound guide channel 12241 that passes through the microphone hole 1214 to the first microphone element 1312 and wraps around the periphery of the first microphone element 1312 via the first sound guide hole 1223. The arrangement of the sound guide channel 12241 may make the sound signal from the first sound guide hole 1223 reach the first microphone element 1312 via the first sound guide hole 1223 and be received by the first microphone element 1312, thereby reducing the leakage of the sound signal during the propagation process, increasing the efficiency of the loudspeaker apparatus to receive the sound signal.

In an application scenario, the loudspeaker apparatus may further include a waterproof mesh 54 arranged in the sound guide channel 12241. The waterproof mesh 54 may be held by the first microphone element 1312 against the soft cover layer 122 facing one side of the microphone element and cover the first sound guide hole 1223.

Specifically, the hard bracket 121 may protrude to from a convex surface opposite to the first microphone element 1312 at a position that closes to the first microphone element 1312 in the sound guide channel 12241. Thus, the waterproof mesh 54 may be sandwiched between the first microphone element 1312 and the convex surface, or may also be directly bonded to the periphery of the first microphone element 1312, and the specific arrangement is not limited herein.

The waterproof mesh 54 in the present embodiment may also have a function of sound permeability, or the like, except for the waterproof function for the first microphone element 1312, to avoid the negative effects for the sound receiving effect of the sound receiving area 13121 of the first microphone element 13121.

It should be noted that since the requirements of the circuit assembly 53 itself, the first microphone element 1312 may be arranged at the first position of the first circuit board 131. However, when the first sound guide hole 1223 is arranged, since the requirements of beautiful, convenient, or the like, the first sound guide hole 1223 may be arranged at the second position of the cover 52. In the present embodiment, the first position and the second position may not correspond to each other in the width direction of the cover 52. As a result, the main axis of the first sound guide hole 1223 and the main axis of the sound receiving area 13121 of the first microphone element 1312 may be arranged at intervals in the width direction of the cover 52. Thus the sound input by the first sound guide hole 1223 may not be able to reach the sound receiving area 13121 of the first microphone element 1312 along a straight line.

In the present embodiment, the cover 52 may be part of the outer housing of the loudspeaker apparatus, and in order to satisfy the overall aesthetic requirements of the loudspeaker apparatus, the first sound guide hole 1223 may be arranged at the middle part in the width direction of the cover 52 to make the first sound guide hole 1223 be more symmetrical and satisfy the visual needs of a human.

In the application scenario, the corresponding sound guide channel 12241 may be set to have a stepped section along the B-B axis in FIG. 29. Thus, the sound signal introduced by the first sound guide hole 1223 may be transmitted to the first microphone element 1312 via the stepped sound guide channel 12241 and received by the first microphone element 1312.

Figure 37:
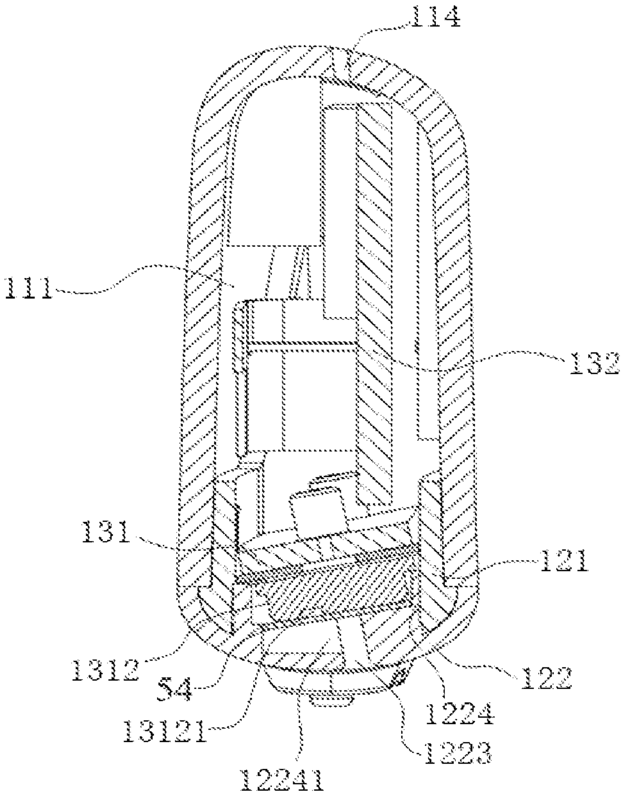
FIG. 37 is a sectional view of a loudspeaker apparatus in a combined state along C-C axis in FIG. 29 of the present disclosure.

Further, referring to FIG. 37, FIG. 37 is a sectional diagram of a loudspeaker apparatus in a combined state along C-C axis in FIG. 29 according to some embodiments of the present disclosure. In an embodiment, the loudspeaker apparatus may further include a light-emitting element 1313. Specifically, the light-emitting element 1313 may be arranged on the first circuit board 131 of the circuit assembly 53 to be accommodated in the cavity 111. For example, the light-emitting element 1313 may be arranged on the first circuit board 131 together with the switch 1311, the first microphone element 1312 in the present embodiments mentioned above with a certain arrangement. It should be noted that the circuit assembly 53 may correspond to a control circuit 60 in the present embodiments mentioned above.

Accordingly, the hard bracket 121 may be equipped with a light-emitting hole 1215 corresponding to the light-emitting element 1313. The soft cover layer 122 may cover the light-emitting hole 1215, and the thickness of an area of the soft cover layer 122 corresponding to the light-emitting hole 1215 may be set to allow the light generated by the light-emitting element 1313 to pass through the soft cover layer 122.

The light-emitting element 1313 may be a light-emitting diode, or the like, and the count of the light-emitting element 1313 may be one or more. The count of light-emitting hole 1215 on the hard bracket 121 may coincide with the light-emitting element 1313. When the count of the light-emitting element 1313 is plural, there may be different light-emitting hole 1215 correspondingly, and different signals may be transmitted through different light-emitting elements 1313.

In the present embodiment, the soft cover layer 122 may still transmit the light emitted by the light-emitting element 1313 to the outside of the loudspeaker apparatus even when the soft cover layer 122 covers the light-emitting hole 1215 by certain ways.

Specifically, in an application scenario, the thickness of the soft cover layer 122 corresponding to the entire area or partial area of the light-emitting hole 121 may be set to be smaller than the thickness of the soft cover layer 122 corresponding to the peripheric area of the light-emitting hole 1215. Thus, the light emitted by the light-emitting element 1313 may be transmitted to the outside through the light-emitting hole 1215 and further through the soft cover layer 122. Certainly, other ways may also be used to make the area that the light-emitting hole 1215 is covered by the soft cover layer 122 transmit light, which is not specifically limited herein. For example, the soft cover layer 122 may be arranged with a window corresponding to the entire area or partial area of the light-emitting hole 1215, and the window may be covered with a layer of transparent or light-transmitting material (e.g., film, quartz, etc.). Thus, the light emitted by the light-emitting element 1313 may be transmitted to the outside through the light-emitting hole 1215 and further through the window.

As set forth above, based on the soft cover layer 122 covering the light-emitting hole 1215 of the corresponding light-emitting element 1313, the soft cover layer may further be configured to enable the light emitted by the light-emitting element 1313 to be transmitted to the outside of the loudspeaker apparatus through the soft cover layer 122. Therefore, the light-emitting element 1313 may be sealed by the soft cover layer 122 without affecting the light-emitting function of the loudspeaker apparatus to improve the sealing and waterproof performance of the loudspeaker apparatus.

Specifically, in one embodiment, the hard bracket 121 may further be equipped with a light barrier 1216 extending toward the inside of the cavity 111 on the periphery of the light-emitting hole 1215, and the light barrier 1216 may limit the transmission direction of the light generated by the light-emitting element 1313.

The shape of the light-emitting hole 1215 may be any shape that may transmit the light emitted by the light-emitting element 1313, such as circular, square, triangular, or the like. In the present embodiment, the shape of the light-emitting hole 1215 may be circular.

Since a certain distance between the light-emitting element 1313 and the light-emitting hole 1215 may exist, if a constraint is not set, a part of the light emitted by the light-emitting element 1313 may be leaked during the process of reaching the light-emitting hole 1215, which is not effectively transmitted to the light-emitting hole 1215, thereby reducing the brightness of the light that may be seen from the outside of the loudspeaker apparatus, which is inconvenient for the user to receive signals. In the present embodiment, the arrangement of the light barrier 1216 may limit the transmission direction of the light generated by the light-emitting element 1313 to reduce the light leakage, thereby increasing the brightness of the light transmitted from the light-emitting hole 1215.

Specifically, the light barrier 1216 in the present embodiment may be partially or completely formed by the hard bracket 121. For example, the hard bracket 121 may extend to the inside of the cavity 111 along the periphery of the light-emitting hole 1215, and wrap around the light-emitting element 1313, thereby, a light channel for transmitting the light may be formed, via the light channel. The light generated by the light-emitting element 1313 may be directly transmitted toward the light-emitting hole 1215 along the arrangement direction of the channel. Alternatively, the hard bracket 121 may also not form a light channel, but only limiting the transmission of the light from one direction or in several directions. For example, the hard bracket 121 may extend to the inside of the cavity 111 only by one side of the light-emitting hole 1215 to form the light barrier 1216 for blocking the light-emitting element 1313 by one side. It may further cooperate with other components to limit the transmission of the light. For example, the hard bracket 121 may extend to the inside of the cavity 111 by one side of the light-emitting hole 1215 to form the light barrier 1216 for blocking the light-emitting element 1313 by one side. The barrier 1216 may further match the inner wall or the hard bracket 121, or other structures of the cavity 111 to limit the transmission direction of the light generated by the light-emitting element 1313 from the plurality of directions.

In an application scenario, the light-emitting element 1313 may be arranged adjacent to the first microphone element 1312 on the first circuit board 131. The corresponding light-emitting hole 1215 and the microphone hole 1214 may be arranged on the hard bracket 121 at intervals. As set forth above, a first sound barrier 1224 formed by the soft cover layer 122 defining the sound guide channel 12241 may be arranged on the periphery of the first microphone element 1312, and the first sound barrier 1224 may be arranged through the microphone hole 1214, thereby, the first microphone element 1312 and the light-emitting element 1313 and the microphone hole 1214 and the light-emitting hole 1215 may be arranged at intervals.

Specifically, in the application scenario, the light barrier 1216 formed by the hard bracket 121 may be in combination with one sidewall of the first sound barrier 1224 closing to the light-emitting element 1313, and the two may jointly limit the transmission direction of the light generated by the light-emitting element 1313.

In another application scenario, the cavity 111 may be arranged in a strip shape on a section perpendicular to the direction of the opening 112. Correspondingly, the hard bracket 121 in a strip shape may also be inserted into the cavity 111 from the opening 112 through the insert part 1211, thereby, a mechanical connection may be formed with the cavity 111. The insert part 1211 may be arranged along two sides of the length direction of the hard bracket 121. Thus the light-emitting element 1313 may also be arranged with the corresponding insert part 1211 of the hard bracket 121 on two sides along the length direction of the hard bracket 121 to limit the light on two sides of the light-emitting element 1313. Further, in the application scenario, the light barrier

1216 may be arranged on one side of the light-emitting element 1313 perpendicular to the length direction of the hard bracket 121, and the sidewall of the first sound barrier 1224 may be arranged on the other side of the light-emitting element 1313 perpendicular to the length direction of the hard bracket 121. The light barrier 1216 and the sidewall of the first sound barrier 1224 may be boards parallel with each other, and further limit the transmission direction of the light generated by the light-emitting element 1313 together with the insert part 1211 on two sides of the light-emitting element 1313.

Referring to FIGS. 29, 32, 35, and 36, in an embodiment, the circuit assembly 53 of the loudspeaker apparatus may include the first circuit board 131 in the present embodiments of the loudspeaker apparatus mentioned above, and may further include the second circuit board 132, specifically.

Specifically, the second circuit board 132 may be arranged facing the accommodating body 51, and the second circuit board 132 may be inclined to the first circuit board 131 in the cavity 111. The second microphone element 1321 may be arranged on one side of the second circuit board 132 facing the accommodation body 51.

It should be noted that the second circuit board 132 may correspond to the second branch circuit board in the present embodiments mentioned above.

The second microphone element 1321 may be arranged facing the sidewall of the accommodating body 51. Thus, a larger space near the second microphone element 1321 may exist, which may be convenient to set the functions corresponding to the second microphone element 1321 on the accommodating body 51. Further, the second circuit board 132 may be arranged inclined to the first circuit board 131. The functional components on the two boards may be arranged in a dislocation with each other, which may reduce the spacing among the functional components, save and compress the internal space of the loudspeaker apparatus.

The cover 52 or the sidewall of the first sound guide hole 1223 opposite to the accommodating body 51 may be arranged with a second sound guide hole 114.

It should be noted that the first sound guide hole and the second sound guide hole may correspond to the sound-inlet hole in the present embodiments mentioned above.

The second sound guide hole 114 may be arranged on the sidewall of the accommodating body 51, and the second sound guide hole 114 may be away from the first sound guide hole 1223. In some embodiments, the opening 112 of the accommodating body 51 may be an inclined opening. The cover 52 may be inclined with respect to the accommodating body 51. The sidewall of the accommodating body 51 opposite the first sound guide hole 1223 may be a side surface on one side of the cavity 111, and the second sound guide hole 114 may be arranged on a side surface of the accommodating body 51. Further, the second sound guide hole 114 may be arranged on the side surface of the accommodating body 51, and within a range of 3 to 6 mm from the top of the accommodating body 51. Specifically, the value may be 3 mm, 4 mm, 5 mm, 6 mm, or the like.

In some embodiments, when the depth direction of the opening 112 of the accommodating body 51 is vertically arranged with respect to the bottom of the accommodating body, the cover 52 may be horizontally arranged with respect to the accommodating body 51. The sidewall of the accommodating body 51 opposite to the first sound guide hole 1223 may be the top of the cavity 111, and the sound guide hole 114 may be arranged at the top of the accommodating body 51. Further, the second sound guide hole 114 may be arranged at the middle of the top of the accommodating body 51.

As set forth above, the second sound guide hole 114 may be away from the main sound source, thereby reducing the sound received by the second sound guide hole 114 from the main sound source, increasing the ratio of the second sound guide hole 114 to receive environmental noise, and enhancing the effect of noise reduction.

As described in the present embodiments of the loudspeaker apparatus mentioned above in the present disclosure, the cover 52 may be arranged with the first sound guide hole 1223 corresponding to the first microphone element 1312 and the microphone hole 1214, wherein the first microphone element 1312 may be configured to receive the sound input by the first sound guide hole 1223. The second microphone element 1321 may be configured to receive the sound input by the second sound guide hole 114.

Further, the central axis of the second sound guide hole 114 may coincide with the main axis of the sound receiving area of the second microphone element 1321.

When the central axis of the second sound guide hole 114 coincides with the main axis of the sound receiving area of the second microphone element 1321, the noise may be directly guided to the sound receiving area of the second microphone element 1321 via the second sound guide hole 114, reducing the transmission of the noise inside the cavity 111. At the same time, the noise may be directly guided to the sound receiving area 13121 of the first microphone member 1312 via the first sound guide hole 1223. The noise received by the first microphone element 1312 and the second microphone element 1321 may be approximately the same, which facilitates the elimination of noise in subsequent processing and improves the quality of the main sound source.

In some embodiments, the central axis of the second sound guide hole 114 may coincide with or parallel to the central axis of the first sound guide hole 1223.

The second sound guide hole 114 and the first sound guide hole 1223 may have the same central axis direction, that is, the central axes of the two may coincide with or parallel to each other. A sound inlet of the second sound guide hole 114 and a sound inlet of the first sound guide hole 1223 may toward the opposite direction, reducing the main sound source received by the second sound guide hole 114, which facilities the elimination of noise in subsequent processing and improves the quality of the main sound source.

In some embodiments, the main axis of the sound receiving area of the second microphone element 1321 may coincide with or parallel to the main axis of the sound receiving area 13121 of the first microphone element 1312. The sound receiving area of the second microphone element 1321 may receive the sound signal passing through the second sound guide hole 114, and the sound receiving area 13121 of the first microphone element 1312 may receive the sound signal passing through the first sound guide hole 1223. Since the main sound source signal passing through the second sound guide hole 114 may be smaller, the main sound source signal received by the sound receiving area of the second microphone element 1321 may be small, which facilitates to achieve the effect of improving the quality of the audio signal.

In some embodiments, the first circuit board 131 may be arranged parallel to the opening plane of the opening 112 and close to the opening 112. Alternatively, the first circuit board 131 may be arranged inclined to the opening plane of the opening 112 and close to the opening 112. Further, the first circuit board 131 may further be arranged the switch 1311, the light-emitting element 1313, or the like, as mentioned above. The switch 1311, the light-emitting element 1313, and the first microphone element 1312, or the like, may be arranged on the first circuit board according to a certain arrangement. Correspondingly, the switch hole 1213, the light-emitting hole 1215, the microphone hole 1214, or the like, may be arranged on the cover 52 at intervals, respectively, to transmit the signal to the outside of the loudspeaker apparatus via the corresponding holes.

Further, the microphone hole 1214 may be arranged in the central position of the cover 52. The switch hole 1213 and the light-emitting hole 1215 may be arranged on two sides of the microphone hole 1214 in the length direction of the cover 52. The distance between the switch hole 1213 and the light-emitting hole 1215 and the microphone hole 1214 may be in the range of 5 to 10 mm, specifically, the value may be 5 mm, 6 mm, 7 mm, 8 mm, 9 mm, 10 mm, or the like. The distance between the switch hole 1213 and the microphone hole 1214 may be equal to the distance between the light-emitting hole and the microphone hole 1214, it may also be unequal.

In some embodiments, the accommodating body 51 may extend from the opening 112 in a direction perpendicular to the opening plane to form the cavity 111 with a certain width. The second circuit board 132 may be arranged parallel to the width direction of the cavity 111 and perpendicular to the opening plane. Alternatively, the second circuit board 132 may be arranged inclined to the width direction of the cavity 111 and the opening 112 plane. The second circuit board 132 may be arranged inclined to the first circuit board 131 in the cavity 111. The second circuit board 132 may be further equipped with a master control chip, antenna, or the like.

In some embodiments, the second circuit board 132 may be arranged inclined to the width direction of the cavity 111 and the opening plane. The angle between the second circuit board 132 and the cavity 111 may be in the range of 5° to 20°. Specifically, the angle between the second circuit board 132 and the cavity 111 may be any angle within the range mentioned above, such as 5°, 10°, 15°, 20°, or the like, which is not specifically defined herein.

In an application scenario, when the user uses the loudspeaker apparatus, the main axis of the sound receiving area of the second microphone element 1321 may coincide with the main axis of the sound receiving area 13121 of the first microphone element 1312, and the first microphone element 1312 and the second microphone element 1321 may be on a straight line with the user's mouth.

In the present embodiment, the first microphone element 1312 and the second microphone element 1321 may be arranged on the two circuit boards, respectively. The two microphone elements may receive sound signals via the first sound guide hole 1223 and the second sound guide hole 114, one of the microphone elements may be configured to collect the main sounds such as human voice, and the other microphone element may have a collection function of background noise, which is convenient to collect the surrounding environmental noise. The two may cooperate with each other to analyze the received sound signal, which may reduce the noise, or the like, thereby, improving the processing quality of the sound signal.

Further, as shown in FIG. 35 and FIG. 36, FIG. 36 is a structural diagram of different angles between a loudspeaker apparatus in a combined state and FIG. 35 according to some embodiments of the present disclosure. The first circuit board 131 and the second circuit board 132 may be arranged inclined to each other in the same cavity 111, which makes the installation ways of the two circuit boards be more flexible, and adjust the angle between the two circuit boards according to the size and position of the electronic elements on the two circuit boards, thereby, improving the spatial utilization of the loudspeaker apparatus, saving the space of the loudspeaker apparatus when it is further applied to the loudspeaker apparatus, facilitating the thinning of the loudspeaker apparatus.

Further, the angle between the first circuit board 131 and the second circuit board 132 may be in the range of 50° to 150°. Specifically, the angle between the first circuit board 131 and the second circuit board 132 may be any angle within the range mentioned above, for example, 70°, 80°, 90°, 100°, 110°, or the like.

Specifically, in one application scenario, the opening 112 and the cover 52 may be arranged with a corresponding long strip. The shape of the first circuit board 131 may match the shape of the opening 112, and the width d1 of the first circuit board 131 may not be greater than the size of the opening plane in the width direction of the opening 112. Thus, the first circuit board 131 (parallel or inclined to the plane that the opening is arranged) may be accommodated in the cavity 111 closing to the opening 112, that is, the first circuit board 131 may also be arranged in a long strip. Correspondingly, the switch 1311, the light-emitting element 1313, and the first microphone element 1312 may be arranged on the first circuit board 131 at intervals in the length direction of the first circuit board 131, that is, the length direction of the cover 52.

In some embodiments, the second microphone element 1321 may be a bone conductive microphone, and the bone conductive microphone may extend out of the accommodating body 51 via the second sound guide hole 114. The bone conductive microphone may be installed on a sidewall of the accommodating body 51. The sidewall may be a sidewall that fits one side of the user body when the user wears a loudspeaker apparatus so that the bone conductive microphone may better receive the vibration signal of the main sound source. When the user wears a loudspeaker apparatus for voice input, the second microphone element 1321 may mainly collect the vibration signal of the main sound source and compare the vibration signal with the sound signal (including the audio signal and noise) collected by the first microphone element 1312 (air conduction). In some embodiments, the sound signal collected by the first microphone element 1312 may be optimized based on the comparison result mentioned above to obtain a high-quality audio signal.

In some embodiments, the assembly body 50 may be arranged with the second sound guide hole 114 penetrating the sidewall of the cavity 111, and the second sound barrier 115 may be arranged at the position corresponding to the second sound guide hole 114. The second sound barrier 115 may extend to the inside of the cavity 111 via the second sound guide hole 114 to limit the transmission direction of the sound to the second microphone element 1321.

Specifically, in the present embodiment, the second sound guide hole 114 corresponding to the second microphone element 1321 may be arranged on the assembly body 50 and penetrate the cavity 111 to connect the second microphone element 1321 with the outside, thereby making the second microphone element 1321 receive an external sound signal.

The second sound barrier 115 may be a hard material, or a soft material. For example, the second sound barrier 115 may be formed by the accommodating body 51 extending from the inner side of the cavity 111 to the inside of the cavity 111 along the periphery of the second sound guide hole 114. In the present embodiment, the second sound barrier 114 may be formed by a soft rubber that is integrally injecting molded with the accommodating body 51 extending from the inner side of the cavity 111 to the inside of the cavity 111 along the periphery of the second sound guide hole 114. In an application scenario, the second sound barrier 115 may extend to the inside of the cavity 111 around the second sound guide hole 114 and extend to the second microphone element 1321, and surround the sound receiving area of the second microphone element 1321 to form a channel connecting the second sound guide hole 114 and the second microphone element 1321. Thus, the sound signal input from the outside to the second sound guide hole 114 may directly be received by the sound receiving area of the second microphone element 1321 via the channel. In another application scenario, the second sound barrier 115 may not completely surround the second sound guide hole 114, but only extend along one side or two sides of the second sound guide hole 114 to the inside of the cavity 111, and may extend to the second microphone element 1321 to guide the sound input by the second sound guide hole 114 to the second microphone element 1321 to be received by the sound receiving area.

It should be noted that the descriptions of the dual-microphone module of the loudspeaker apparatus are merely an example, and should not be considered as the only feasible implementation option. Obviously, for those skilled in the art, after understanding the basic principles of the dual-microphone module of the loudspeaker apparatus, various modifications and changes in form and detail of the specific manners and steps for implementing the dual-microphone module of the loudspeaker apparatus without departing from the principle, but the modifications and changes are still within the scope described above. For example, the loudspeaker apparatus may further include an audio signal comparison element. The audio signal comparison element may compare the vibration signal of the main sound source collected by the second microphone element 1321 with the sound signal (including the audio signal and noise) collected by the first microphone element 1312 (air conduction), and the sound signal collected by the first microphone element 1312 may be optimized based on the comparison result mentioned above to obtain a high-quality audio signal. Such deformations are within the scope of the present disclosure.

In some embodiments, the loudspeaker apparatus described above may transmit the sound to the user by air conduction. When the sound is transmitted by air conduction, the loudspeaker apparatus may include one or more sound sources. The sound source may be arranged at a particular position of the user's head, for example, head, forehead, cheek, horns, auricle, auricle, or the like, without clogging or covering the ear canal. For the purposes of description, FIG. 38 is a diagram illustrating transmitting sound through air conduction.

Figure 38:
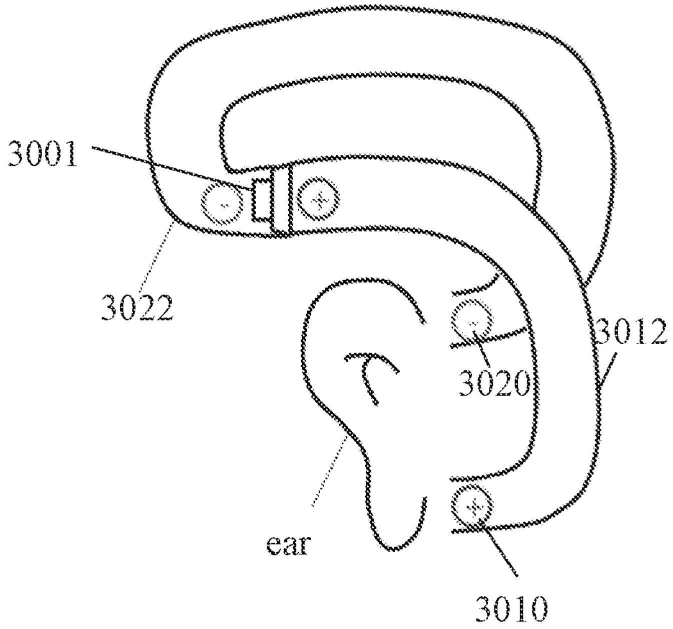
FIG. 38 is a diagram illustrating transmitting sound through air conduction.

As shown in FIG. 38, a sound source 3010 and a sound source 3020 may generate opposite sound waves ("+" and "−" represent the opposite phase in the figure). For the sake of simplicity, the sound source refers to a sound hole outputting sound on the loudspeaker apparatus. For example, the sound source 3010 and the sound source 3020 may be two sound holes that are arranged on a specific position (e.g., the core housings 41, or the circuit housings 20) of the loudspeaker apparatus, respectively.

In some embodiments, the sound source 3010 and the sound source 3020 may be generated by the same vibration device 3001. The vibration device 3001 may include a diaphragm (not shown in the figure). When the diaphragm is driven by an electrical signal, the front of the diaphragm may drive air to vibrate, and the sound source 3010 may be formed at the sound hole via the sound guide channel 3012. The rear of the diaphragm may drive air to vibrate, and the sound source 3020 may be formed at the sound hole via the sound guide channel 3022. The sound guide channel refers to a sound transmission route of the diaphragm to the corresponding sound hole. In some embodiments, the sound guide channel may be a route enclosed by a specific structure (e.g., the core housings 41, or the circuit housings 20) of the loudspeaker apparatus. It should be noted that, in some alternative embodiments, the sound source 3010 and the sound source 3020 may also be generated by different vibration devices through different diaphragm, respectively.

In the sound generated by the sound source 3010 and the sound source 3020, a part may be transmitted to the user's ear to form a user hearing, and the other part may be transmitted to the environment to form a leakage. Considering that the position of the sound source 3010 and the sound source 3020 are closer to the user's ear, for the convenience of description, the sound transmitted to the user's ear refers to the near-field sound, and the leakage transmitted to the environment refers to the far-field sound. In some embodiments, the near-field/far-field sound with different frequencies generated by the loudspeaker apparatus may be related to the spacing between the sound source 3010 and the sound source 3020. In general, the near-field sound generated by the loudspeaker apparatus may increase with the increase of the spacing between the two sound sources, and the generated far-field sound (leakage) may increase as the frequency increases.

The spacing between the sound source 3010 and the sound source 3020 may be designed according to different frequencies of the sound. Thus, the low-frequency and near-field sound (e.g., sound with frequency smaller than 800 Hz) generated by the loudspeaker apparatus may be as large as possible, and the high-frequency and far-field sound (e.g., sound with frequency greater than 2000 Hz) may be as small as possible. To achieve the object mentioned above, the loudspeaker apparatus may include two groups or more dual-sound sources. Each set of the dual-sound sources may include two sound sources similar to the sound source 3010 and the sound source 3020, and generate a particular frequency sound. Specifically, the first set of dual-sound sources may be configured to generate low-frequency sounds, and the second set of dual-sound sources may be configured to generate high frequency sounds. In order to obtain a large low-frequency and near-field sound, the distance between the two sound sources in the first set of dual-sound sources may be set to a large value. Since the long wavelength of the low frequency signal, the larger distance between the dual-sound sources may not form excessive phase difference in the far field, and thus may not form too much leakage in the far field. In order to make the high-frequency and far-field sound smaller, the distance between two sound sources in the second group of the dual-sound sources may be set to a smaller value. Since the shorter wavelength of the high frequency signal, the smaller distance between the dual-sound sources may avoid large phase differences in the far field. Thus, the formation of large sound leakage may be avoided. The distance between the second group of the dual-sound sources may be smaller than the distance between the first group of the dual-sound sources.

The possible benefits effect brought by the embodiments in the present disclosure may include but are not limited to: (1) optimizing the position of the button modules 4*d* on the loudspeaker apparatus and improving the vibration efficiency; (2) improving the sound transfer efficiency of the loudspeaker apparatus and the volume; (3) improving the waterproof effect of the loudspeaker apparatus; (4) reducing the loss of the sound input via the sound-inlet hole 413 and improving the conversion rate of the sound into the vibration of the waterproof membrane body 4*c*11; (5) improving the waterproof and protection effect of the internal device of the core housings 41; (6) avoiding the loss and echo caused by the main sound source being transmitted in the cavity repeatedly, and also avoiding the main sound source to be transmitted to the area that the second microphone element 1321 is arranged via the channel inside the cavity, thereby playing the effect of improving the sound effect. It should be noted that the beneficial effects of different embodiments may be different. In various embodiments, the beneficial effects that may be generated may be any one or a combination thereof, or any other beneficial effect that may be obtained.

The basic concepts have been described above. Obviously, to those skilled in the art, the disclosure of the invention is merely by way of example, and does not constitute a limitation on the present disclosure. Although not explicitly stated here, those skilled in the art may make various modifications, improvements, and amendments to the present disclosure. These alterations, improvements, and modifications are intended to be suggested by this disclosure, and are within the spirit and scope of the exemplary embodiments of this disclosure.

What is claimed is:

1. A loudspeaker apparatus, comprising:

a core housing, the core housing including a peripheric sidewall and a bottom wall connected to one end surface of the peripheric sidewall, the peripheric sidewall and the bottom wall forming an accommodating space with an opening at one end;

a flexible circuit board disposed in the accommodating space, the flexible circuit board including a main circuit board and a branch circuit board connected with the main circuit board, wherein a plurality of first welding pads is arranged on an end of the main circuit board away from the branch circuit board, a plurality of second welding pads is arranged on an end of the branch circuit board away from the main circuit board, and one of the plurality of first welding pads is electrically connected to one of the plurality of second welding pads through a lead on the flexible circuit board;

a button module attached to the main circuit board, wherein the button module is electrically connected to a control circuit through the flexible circuit board and an auxiliary signal wire electrically connecting to the flexible circuit board;

an earphone core accommodated in the accommodating space of the core housing, wherein the earphone core is electrically connected to the control circuit through the flexible circuit board and an audio signal wire electrically connecting to the flexible circuit board; and a support connection member configured to contact with a user's head, the core housing being connected to the support connection member.

2. The loudspeaker apparatus of claim 1, wherein at least part of the plurality of second welding pads is closer to the peripheric sidewall than a connection position of the main circuit board and the branch circuit board.

3. The loudspeaker apparatus of claim 1, wherein the button module is arranged on a side of the flexible circuit board facing the bottom wall.

4. The loudspeaker apparatus of claim 3, wherein the plurality of the first welding pads is arranged on a side of the flexible circuit board away from the bottom side wall.

5. The loudspeaker apparatus of claim 4, wherein the main circuit board is arranged with a first rigid support board on a side away from the button module for supporting the button module and maintaining the plurality of the first welding pads exposed, the main circuit board is arranged with a second rigid support board on a side away from the plurality of the first welding pads for supporting the plurality of the first welding pads and maintaining the button module exposed, and the branch circuit board is arranged with a third rigid support board on a side away from the plurality of the second welding pads for supporting the plurality of the second welding pads.

6. The loudspeaker apparatus of claim 1, wherein the branch circuit board extends in a direction perpendicular to the main circuit board.

7. The loudspeaker apparatus of claim 1, wherein a contact position between the support connection member and a human head includes at least one contact point; and a distance between a center of the button module and one of the at least one contact point is not greater than a distance between a center of the core housing and the one of the at least one contact point.

8. The loudspeaker apparatus of claim 7, wherein a distance between the center of the button module and the at least one contact point is a first distance;

a distance between the center of the core housing and the at least one contact point is a second distance; and a ratio between the first distance and the second distance is not greater than 0.95.

9. The loudspeaker apparatus of claim 8, wherein a ratio between the mass of the button module and the mass of a loudspeaker assembly including the core housing and the earphone core is not greater than 0.3.

10. The loudspeaker apparatus of claim 1, wherein:

the peripheric sidewall includes a first peripheric sidewall arranged along a length direction of the bottom wall and a second peripheric sidewall arranged along a width direction of the bottom wall.

11. The loudspeaker apparatus of claim 10, wherein the button module is arranged at a central position of the bottom wall, or the button module is arranged between the central position and a top position of the bottom wall.

12. The loudspeaker apparatus of claim 11, wherein the button module includes a button and an elastic bearing pedestal configured to support the button; and the bottom wall is configured with a button hole configured to cooperate with the button.

13. The loudspeaker apparatus of claim 1, wherein a connection part of the support connection member and the core housing has a central axis, an extension line of the central axis has a projection on a plane that the outer sidewall of the button module is arranged, and an angle between the projection and a major-axis direction of the button module is less than 10°.

14. The loudspeaker apparatus of claim 13, wherein the major-axis direction and a minor-axis direction of the outer sidewall of the button module have an intersection point, a shortest distance between the projection and the intersection point is less than a size of the outer sidewall of the button module in the minor-axis direction.

15. The loudspeaker apparatus of claim 1, wherein a first depression area is arranged on an inner surface of the core housing, and the core housing is configured with a button hole arranged in the first depression area and configured to connect the inner surface and an outer surface of the core housing.

16. The loudspeaker apparatus of claim 15, wherein the button module further includes:

an elastic bearing pedestal including an integrally formed bearing pedestal body and a support column, wherein the bearing pedestal body is arranged in the first depression area and fixed to the bottom of the first depression area, the support column is arranged on one side of the bearing pedestal body facing the outside of the core housing and exposed out of the button hole.

17. The loudspeaker apparatus of claim 16, wherein the bearing pedestal body includes an annular fixing part arranged around the button hole and attached and fixed to the bottom of the first depression area, and an elastic support part connected to an inner ring-shaped surface of the annular fixed part and bulging in a dome shape facing the outside of the core housing, wherein the support column is arranged at the top of the elastic support part.

18. The loudspeaker apparatus of claim 16, wherein a second depression area is arranged on the outer surface of the core housing, wherein the button hole is further arranged in the second depression area.

19. The loudspeaker apparatus of claim 16, wherein the button module includes a button body, a first annular flange and a second annular flange arranged on one side of the button body, the first annular flange is arranged in an middle area of the button body, the second annular flange is arranged on an outer edge of the button body, the support column is inserted inside the first annular flange, an end surface of the second annular flange away from the button body is sunk in the second depression area, and is spaced apart from the bottom of the second depression area by a certain distance when the elastic bearing pedestal is in a natural state.

20. The loudspeaker apparatus of claim 16, wherein the elastic bearing pedestal further includes a contact head arranged on an inner side of the bearing pedestal body adjacent to the core housing and configured to contact a button of the button module.

* * * * *